US008164640B2

(12) United States Patent
Vartiainen et al.

(10) Patent No.: US 8,164,640 B2
(45) Date of Patent: Apr. 24, 2012

(54) CAMERA CONTROL MEANS TO ALLOW OPERATING OF A DESTINED LOCATION OF THE INFORMATION SURFACE OF A PRESENTATION AND INFORMATION SYSTEM

(75) Inventors: Panu Vartiainen, Vääksy (FI); Suresh Chande, Espoo (FI); Kimmo Rämö, Espoo (FI)

(73) Assignee: Nokia Corporation, Espoo (FI)

( * ) Notice: Subject to any disclaimer, the term of this patent is extended or adjusted under 35 U.S.C. 154(b) by 1128 days.

(21) Appl. No.: 11/920,491

(22) PCT Filed: Jun. 30, 2005

(86) PCT No.: PCT/FI2005/050263
§ 371 (c)(1),
(2), (4) Date: Nov. 16, 2007

(87) PCT Pub. No.: WO2007/003682
PCT Pub. Date: Jan. 11, 2007

(65) Prior Publication Data
US 2009/0086042 A1    Apr. 2, 2009

(51) Int. Cl.
*H04N 5/232* (2006.01)
(52) U.S. Cl. .................. 348/211.4; 348/207.2; 348/345
(58) Field of Classification Search ............... 348/207.2, 348/211.4, 345
See application file for complete search history.

(56) References Cited

U.S. PATENT DOCUMENTS

| | | | |
|---|---|---|---|
| 5,239,373 A | 8/1993 | Tang et al. | 358/93 |
| 5,528,263 A | 6/1996 | Platzker et al. | 345/156 |
| 6,188,388 B1 | 2/2001 | Arita et al. | 345/158 |
| 6,819,487 B2 | 11/2004 | Palovuori et al. | 359/443 |
| 6,952,198 B2 | 10/2005 | Hansen | 345/158 |
| 7,083,100 B2 | 8/2006 | Njolstad | 235/462.13 |
| 7,171,622 B2 | 1/2007 | Bhogal | 715/730 |
| 7,315,751 B2 | 1/2008 | Kurakane | 455/556.1 |
| 7,710,391 B2 | 5/2010 | Bell et al. | 345/156 |
| 8,046,701 B2 | 10/2011 | Chiu et al. | 715/761 |
| 2002/0065872 A1 | 5/2002 | Genske et al. | 709/202 |
| 2002/0126136 A1 | 9/2002 | Lin | |
| 2002/0163511 A1 | 11/2002 | Sekendur | 345/179 |
| 2003/0030622 A1 | 2/2003 | Vaarala | 345/158 |

(Continued)

FOREIGN PATENT DOCUMENTS

JP    2004 328318    11/2004

(Continued)

OTHER PUBLICATIONS

University of Cambridge, Computer Laboratory, Research, Spotcode Interfaces, Mar. 23, 2005, 6 pages, http://www.cl.cam.ac.uk/Research/SRG/netos/uid/spotcode.html.
Heingartner, D., "Connecting Paper and Online Worlds by Cellphone Camera", Published Oct. 7, 2004, 4 pgs.

(Continued)

*Primary Examiner* — Phuoc Nguyen
(74) *Attorney, Agent, or Firm* — Harrington & Smith

(57) ABSTRACT

The invention concerns a control device for controlling an information device arrangement. Control device includes camera means (CAM) and display means (VF) to allow operating of a destined location (21) of the information surface. Destined location is adapted for determination from the control information being in the image information (IMAGE) formed by the camera means (CAM). The control device is arranged at least to determine from the control information of the image information (IMAGE) data (x1, y1, hei, wid, gx, gy) in order to determine a continuous stream of locations pointed by the control device. System, method and program products are also targets of the present invention.

53 Claims, 8 Drawing Sheets

U.S. PATENT DOCUMENTS

Figure 1:
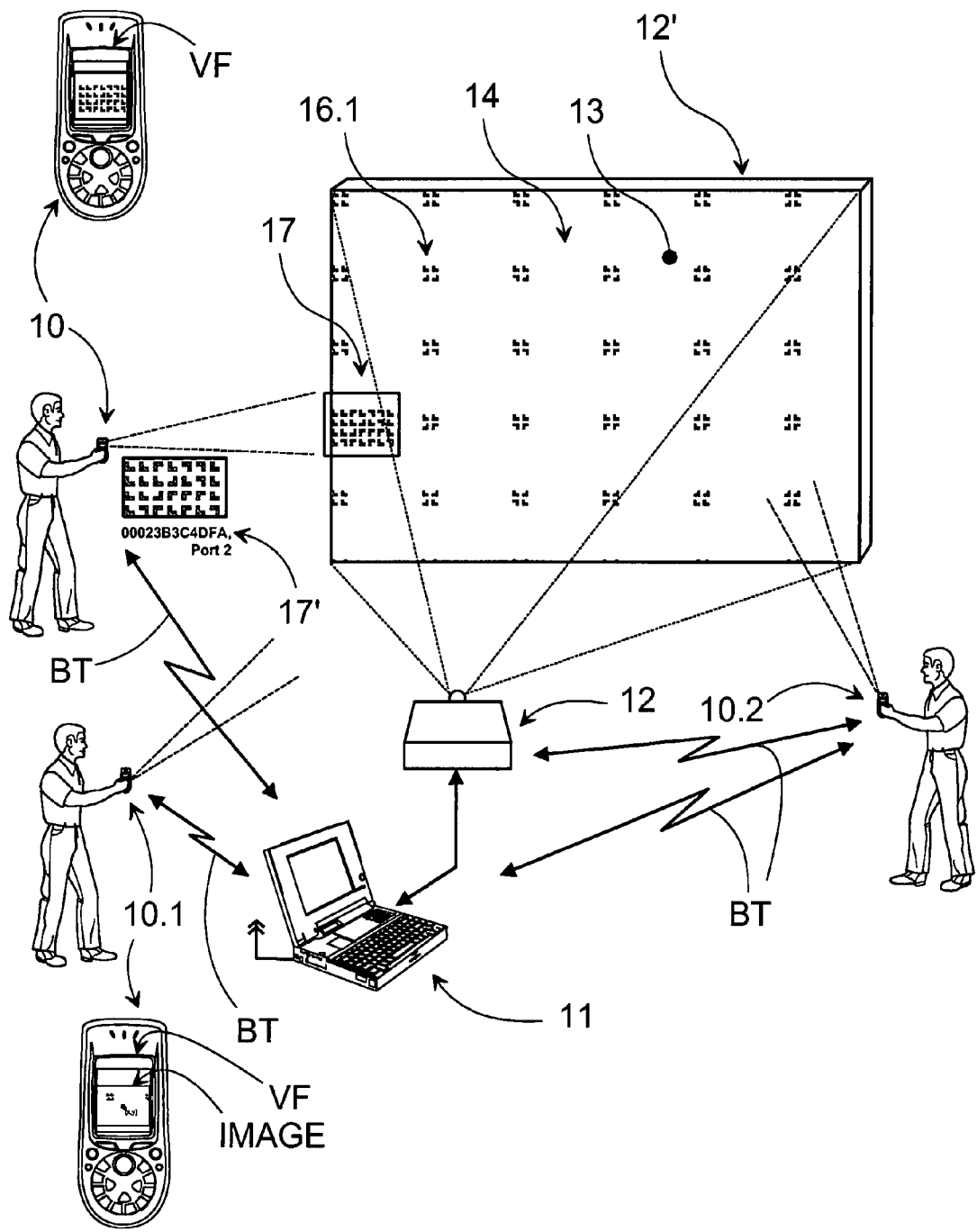

| | | | |
|---|---|---|---|
| 2003/0053714 A1* | 3/2003 | Esaki et al. | 382/287 |
| 2004/0255034 A1* | 12/2004 | Choi | 709/229 |
| 2005/0004982 A1* | 1/2005 | Vernon et al. | 709/204 |
| 2005/0007351 A1 | 1/2005 | Fabrick | 345/181 |
| 2005/0102422 A1* | 5/2005 | Yamamote et al. | 709/238 |
| 2005/0146518 A1* | 7/2005 | Wang et al. | 345/179 |
| 2007/0205980 A1 | 9/2007 | Dijk | 345/156 |
| 2008/0012839 A1 | 1/2008 | Feague et al. | 345/179 |
| 2009/0040195 A1 | 2/2009 | Njolstad et al. | 345/180 |

FOREIGN PATENT DOCUMENTS

| | | |
|---|---|---|
| KR | 2003028525 | 4/2003 |
| WO | WO 01/52230 A1 | 7/2001 |
| WO | WO 02/03315 A1 | 1/2002 |
| WO | WO 02/03316 A1 | 1/2002 |
| WO | WO/2004/047011 A2 | 6/2004 |

* cited by examiner

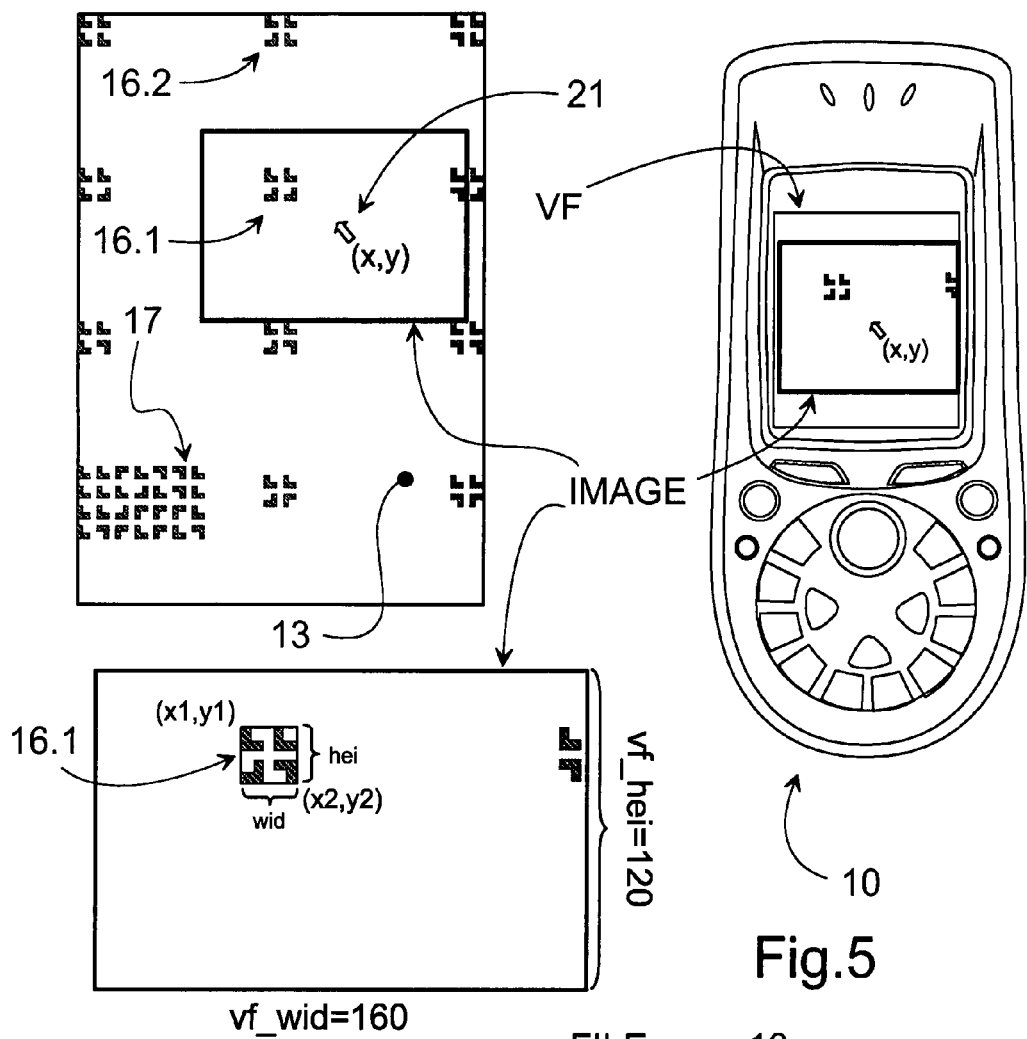
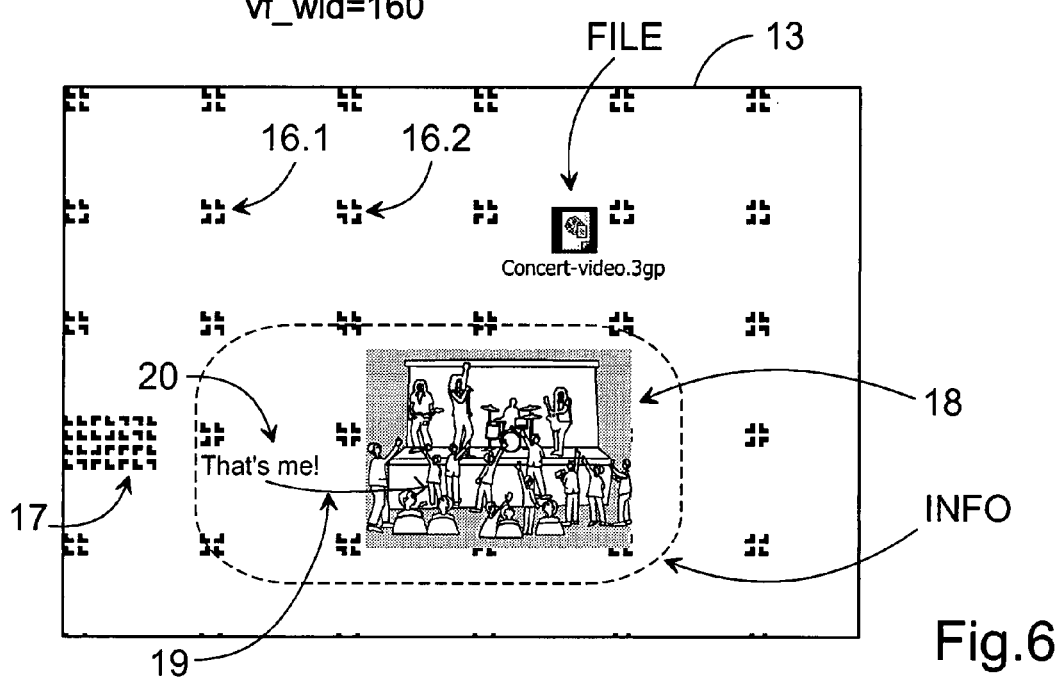
Fig.5
Fig.6

CAMERA CONTROL MEANS TO ALLOW OPERATING OF A DESTINED LOCATION OF THE INFORMATION SURFACE OF A PRESENTATION AND INFORMATION SYSTEM

The invention concerns a control device for controlling an information device arrangement, which control device includes camera means and display means to allow operating of a destined location of the information surface, which destined location is adapted for determination from the control information being in the image information formed by the camera means. In addition, the invention also concerns a corresponding system, method and program products for implementation of the invention.

Distribution of information between participants in negotiations in a negotiation room is usually done by prepared overhead slide presentations (for example, PowerPoint). It is also possible to use special smart white boards, provided that the negotiation premises are equipped with such.

In certain applications, especially in the case of digital white boards, visual information can be efficiently manipulated on an information surface, on which the information is presented by using an information apparatus. However, since digital white board systems are often quite cost-intensive, their use is limited. For this reason, every negotiation room is not necessarily provided with those.

If the negotiating parties wish to distribute one another something during the negotiation, for example, electronic additional information brought about during the negotiation, this is difficult to do. According to the state of the art, distribution of information can usually be done only afterwards. The matter may hereby be dealt with in such a way, for example, that the concerned information is sent to each negotiating party hungry for information, for example, by electronic mail. If it is desired to distribute electronic information already in the negotiation situation, then each interested person must connect his device (usually a laptop computer) to the presentation apparatus system in order to transfer the information to his own device. A corresponding connection must also be made for transferring information from the personal device to the presentation apparatus for visualisation or distribution of information.

Yet another drawback in state-of-the-art information systems is that in these only one participant at a time can control the information apparatus. Hereby the other participants in the idea generation or brainstorming team become passive and can at the most just comment on the matter visualised by the presenter on the presentation apparatus.

The state of the art as regards the presentation equipment of negotiation rooms is represented by separate devices, which make possible either just visualisation of information (for example, a data projector connected to a computer) or, in addition, also editing of the information and creation of new information. Such more sophisticated devices are, for example, various integrated touch screens/pen-operated digital white boards, which are provided with embedded softwares. One example of this is the SMART Board system. Another example is the ANOTO—Digital pen and yet a third example is Ebeam. In Ebeam, a sensor is connected to a corner of a manual white board. There the cap of a container emits a signal, which is measured by the sensor. However, the device needs calibrating when put in a new place.

An example of a solution of the SMART Board type is known from the international PCT patent publication WO 02/03316 A1. Therein the corners of the information surface include cameras. The cameras are used to form image information of the information surface. From the image information, the location of the control device touching the information surface can be recognised at each time. The desired action is directed at the point of contact of the control device.

However, such digital apparatuses of the white board type are expensive special devices. This limits the possibilities of arranging them in each negotiation premises. In addition, controlling them is normally possible only by special pens or by equivalent input devices. In addition, they have been limited to serve only couple of persons at a time in the presenting/editing of information, and the persons must also be in the immediate vicinity of the white board.

One more prior art is known in which mobile camera device and control information arranged on information surface is applied. However, this "SpotCode" concept [1] isn't suitable, for example, for meeting room implementations but rather for discrete presenting systems in which the location of the controlled objects are fixed to a particular location of the information surface.

The purpose of this invention is to provide a manner of controlling an information device arrangement. With the invention a manner is achieved of controlling an existing presentation, of editing and/or creating new information and/or of distributing it to other users, which manner is effortless from the viewpoint of one end user or even more end users. The characteristic features of the control device according to the invention are presented in the appended Claim 1, while the characteristic features of the method are presented in Claim 27.

The invention also concerns a corresponding system and program products, whose characteristic features are presented in the appended Claims 10, 40 and 44.

In the invention, an electronic device equipped with camera and display means is surprisingly used as the control device for the information device arrangement. In consequence of this, the control device can be used for operating the information surface in a surprising manner without contact. Such mobile station equipment can be mentioned as an example of a control device, for which the necessary functionalities can be arranged to control the information apparatus in the manner according to the invention.

With the intelligible device equipped with a camera the destined location can be pointed at the information surface without any contact with the information surface, and the place of the concerned location can be determined. The place of the targeted location can be determined from the image information formed by the camera. When the location has been determined, the desired actions can be directed at the concerned location. The location may be selected freely.

Such actions can be understood broadly in the context of the invention. Besides the actions for controlling and creating information, which are known from the traditional digital presentation devices, information can also be transferred from the information apparatus to the control device from this pointed location on the surface. It is also possible to transfer information from the control device towards the information apparatus, for example, to a location targeted on the information surface. The invention in fact offers numerous alternative actions, and none of them are mutually exclusive within the scope of the basic inventive idea.

In order to determine the location on the information surface, which is pointed by the device equipped with a camera, special control information can be presented on this same or even on some other information surface. The control information may form a refined and controllable, even dynamic arrangement. It will not essentially cause any harm to the interpretability of the actual information to be presented by the presentation means, if the information to be presented and the control information are presented, for example, on the same information surface. The control information is arranged on the information surface in such a manner that it permits the controlling of the whole wide information surface area without limiting to some special location.

According to one embodiment, based on the continuous streaming of image information formed by the control device, this device may be used to determine data concerning the place and size of the control information in the image information. This data or the data calculated and determined from it in an established manner may be transmitted at least partly, for example, together with the size of the image information to the information apparatus for determination of the pointed location on the information surface. It is also possible to transmit just the image data to the information apparatus. Using the information apparatus it is possible to carry out a final determination of the operated location. With such a determination, which is a two-step one in a certain sense, is achieved decentralisation of the functionality to the control device and, on the other hand, also a more accurate determination of the operation location.

The control device and the information apparatus may communicate with one another, for example, by applying a wireless local area network. Hereby setting information relating to the connection settings between them can also be presented on the information surface. From the setting information it is possible to decode connection setting data for carrying out communication between the devices, and they are easily recognised from the image information formed by the camera means. In this manner such an advantage is achieved, among others, that the user need not now set connection setting data in his device, for example, manually, which would in fact be difficult and troublesome. This also speeds up start-up of the system and the connection to it and, in addition, makes also possible to control the presentation by a plurality of control devices.

The invention allows several applications, with which numerous advantages are achieved in terms of information control, presentation, creation, editing, distribution and receiving. Besides the traditional 2D control, 3D control of the presented information is now also possible.

Other features characterizing the invention emerge from the appended claims, and more advantages, which can be achieved, are listed in the description.

Figure 2:
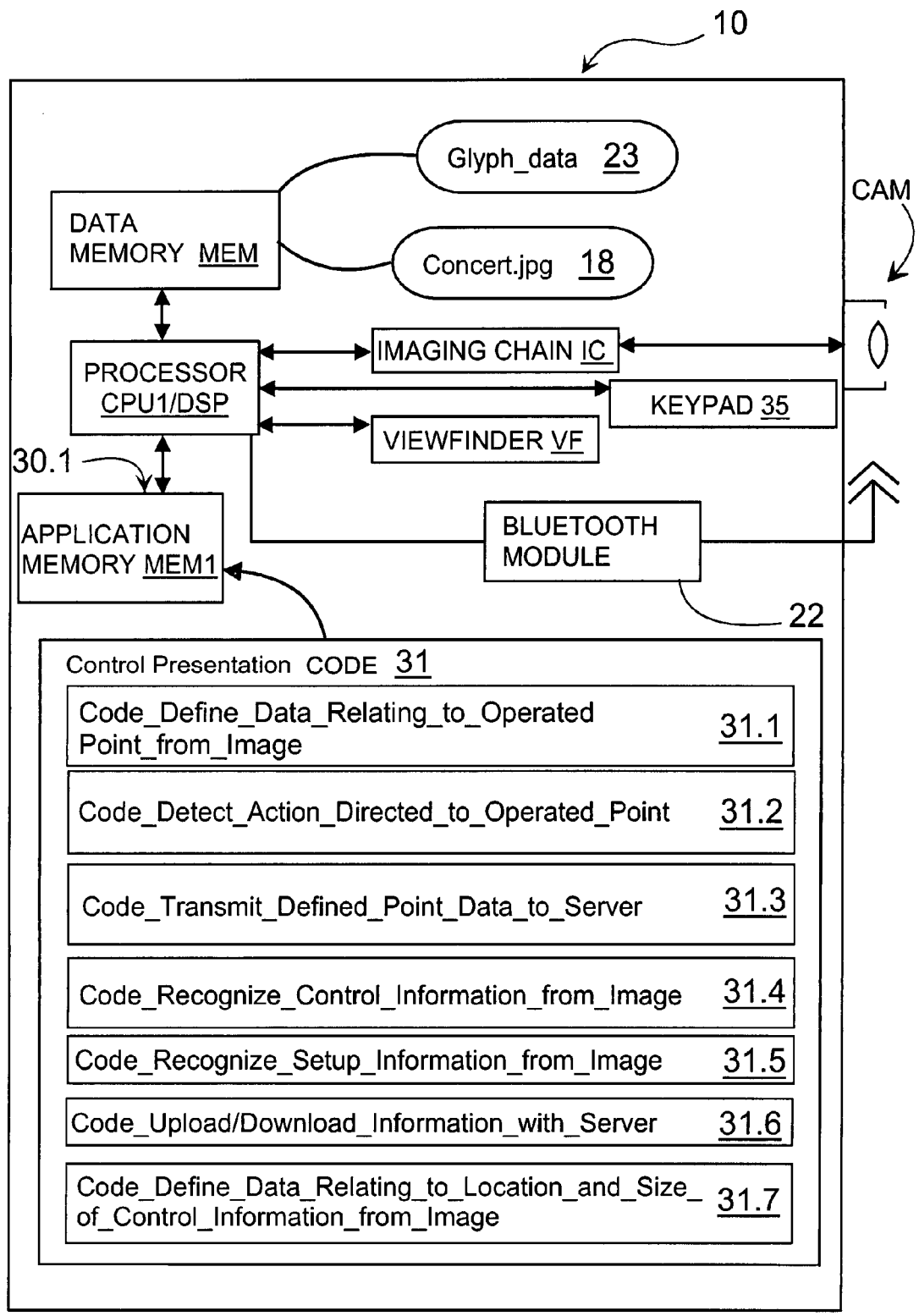
Figure 3:
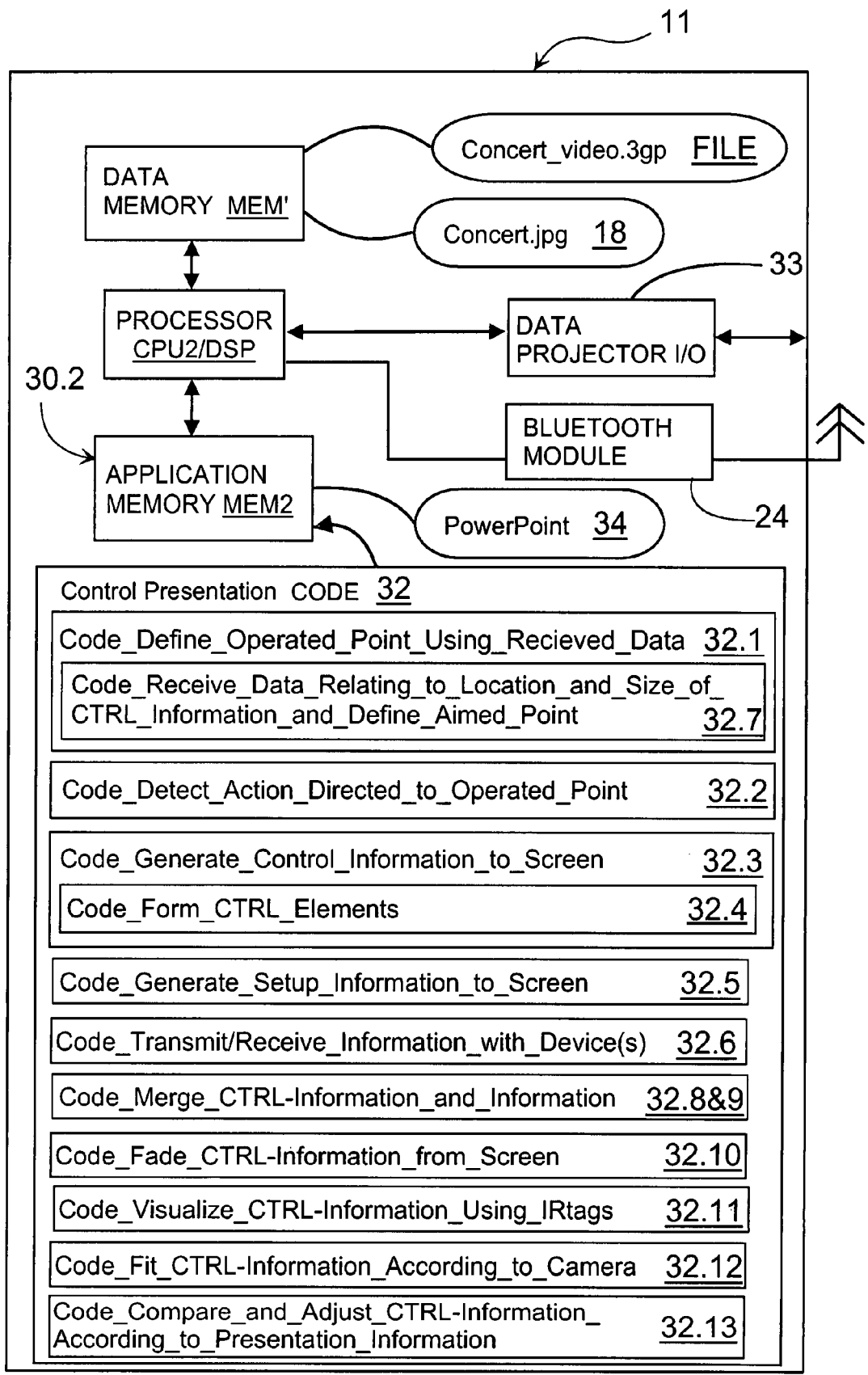
Figure 4:
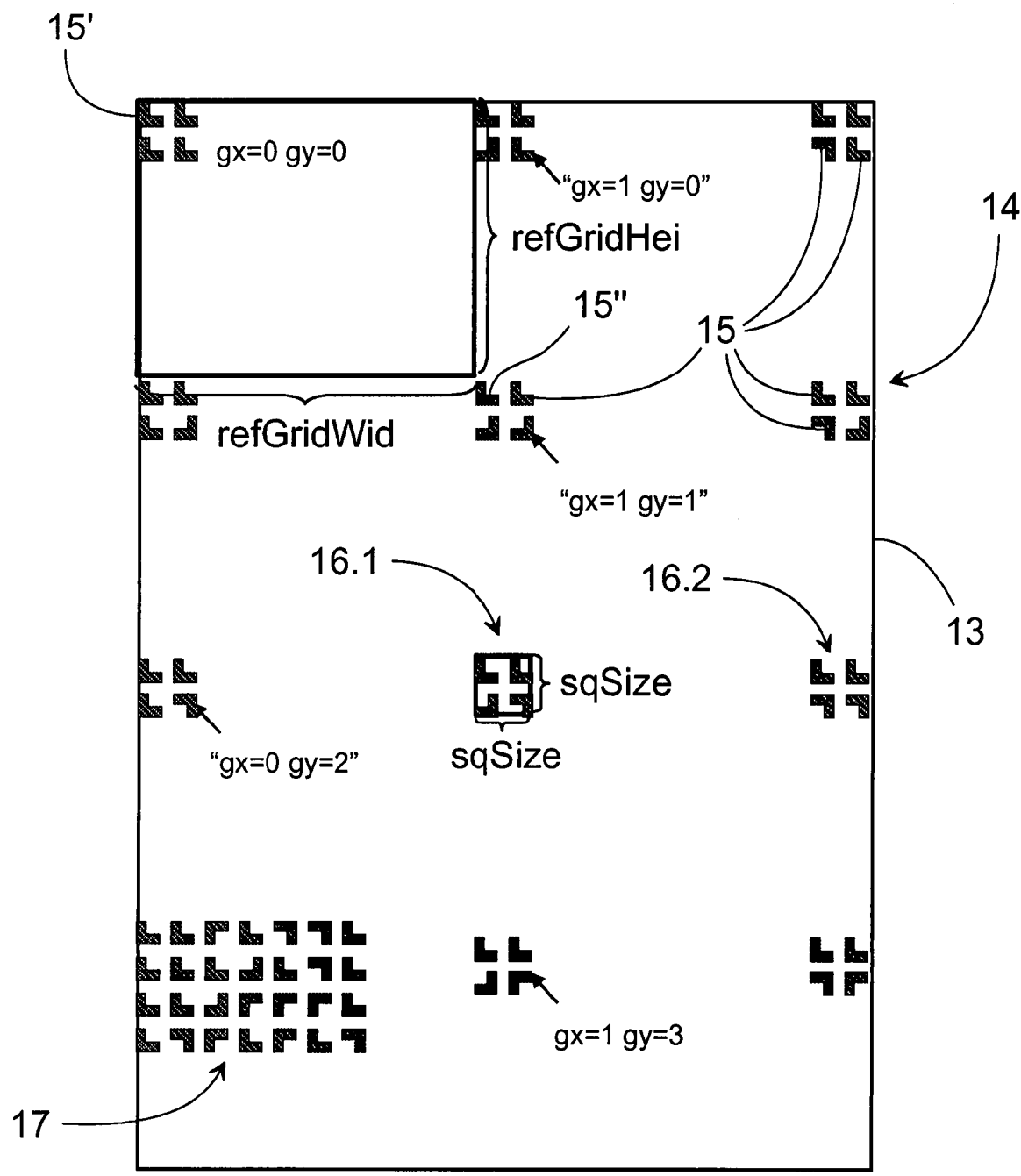
Figure 7:
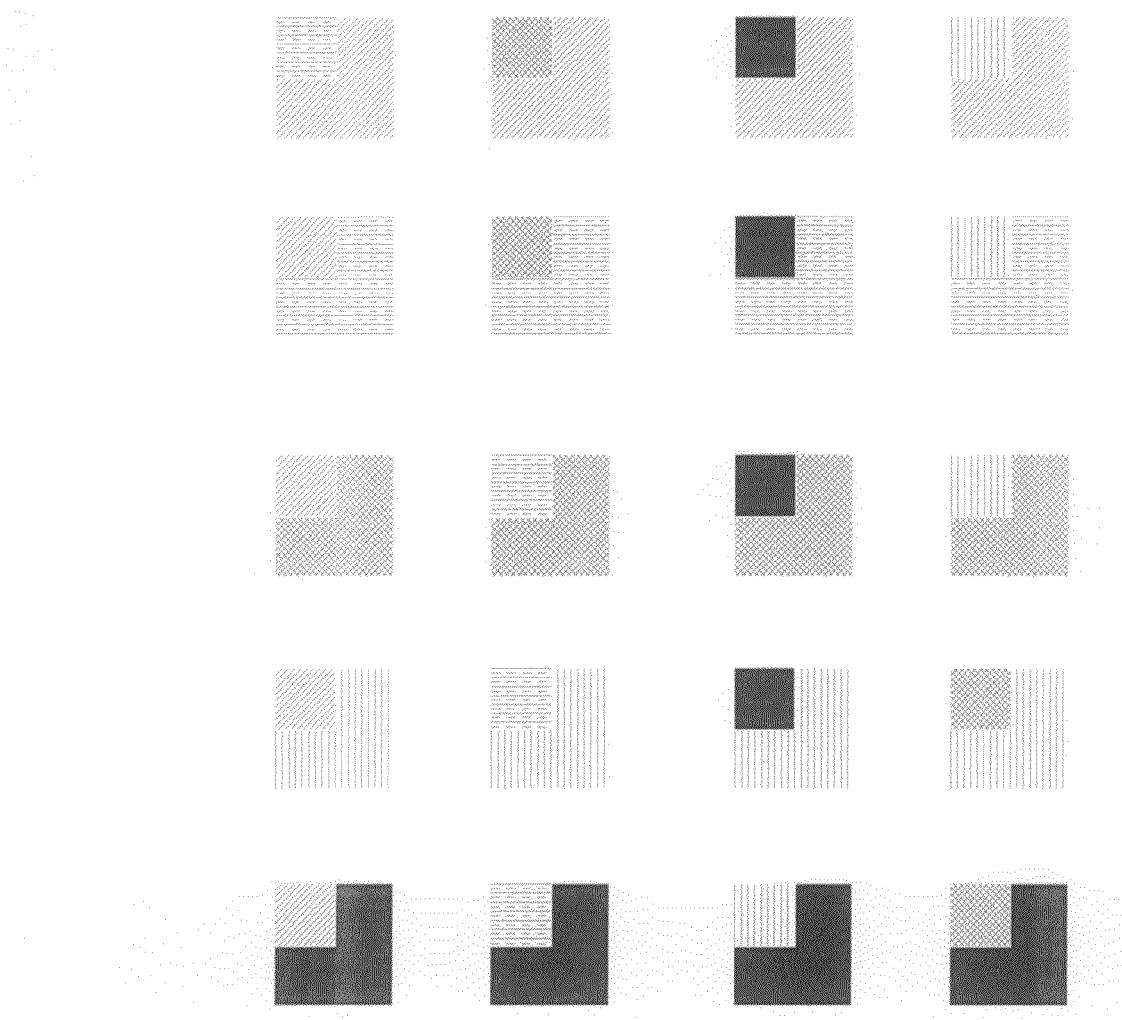
Figure 8:
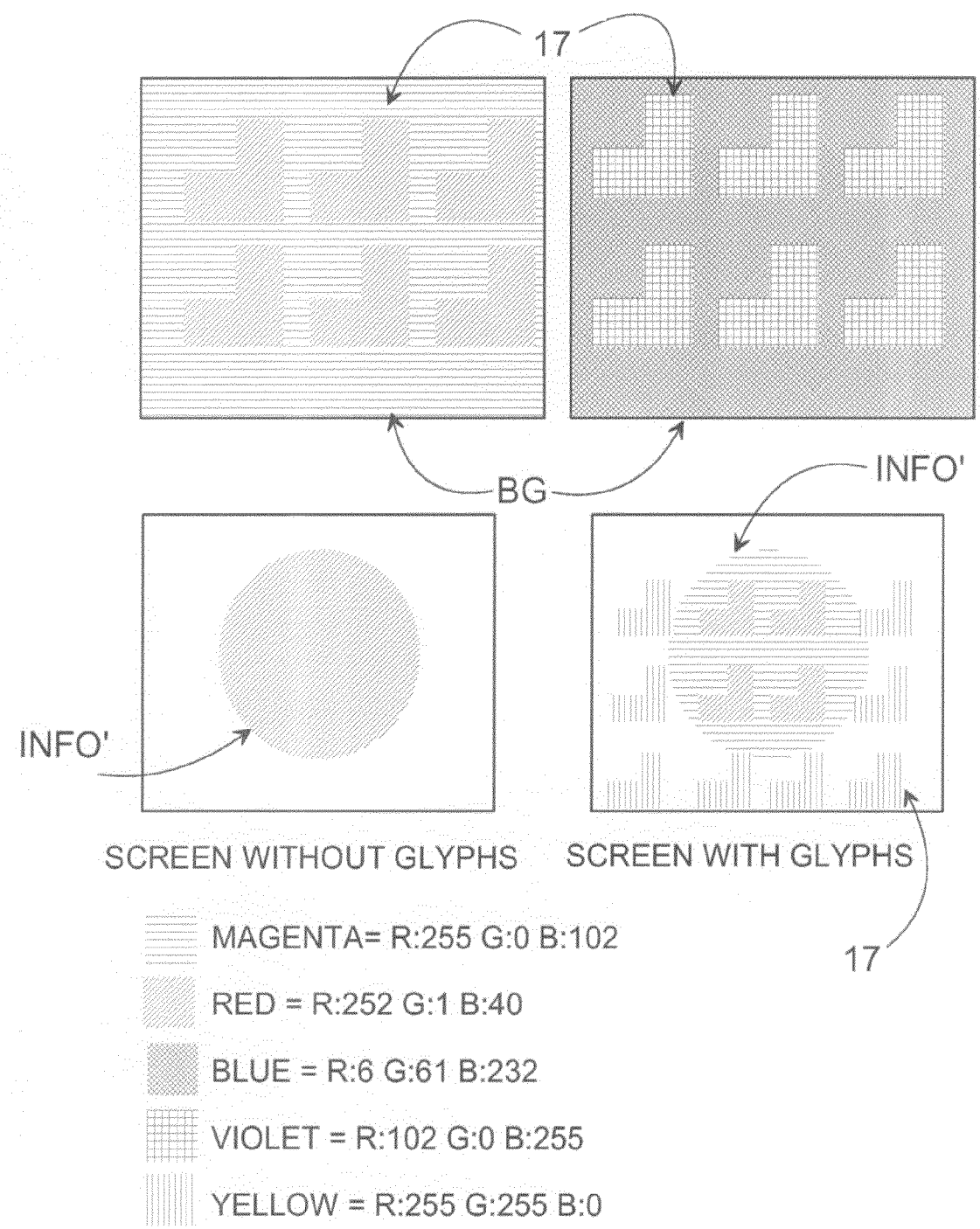
Figure 9:
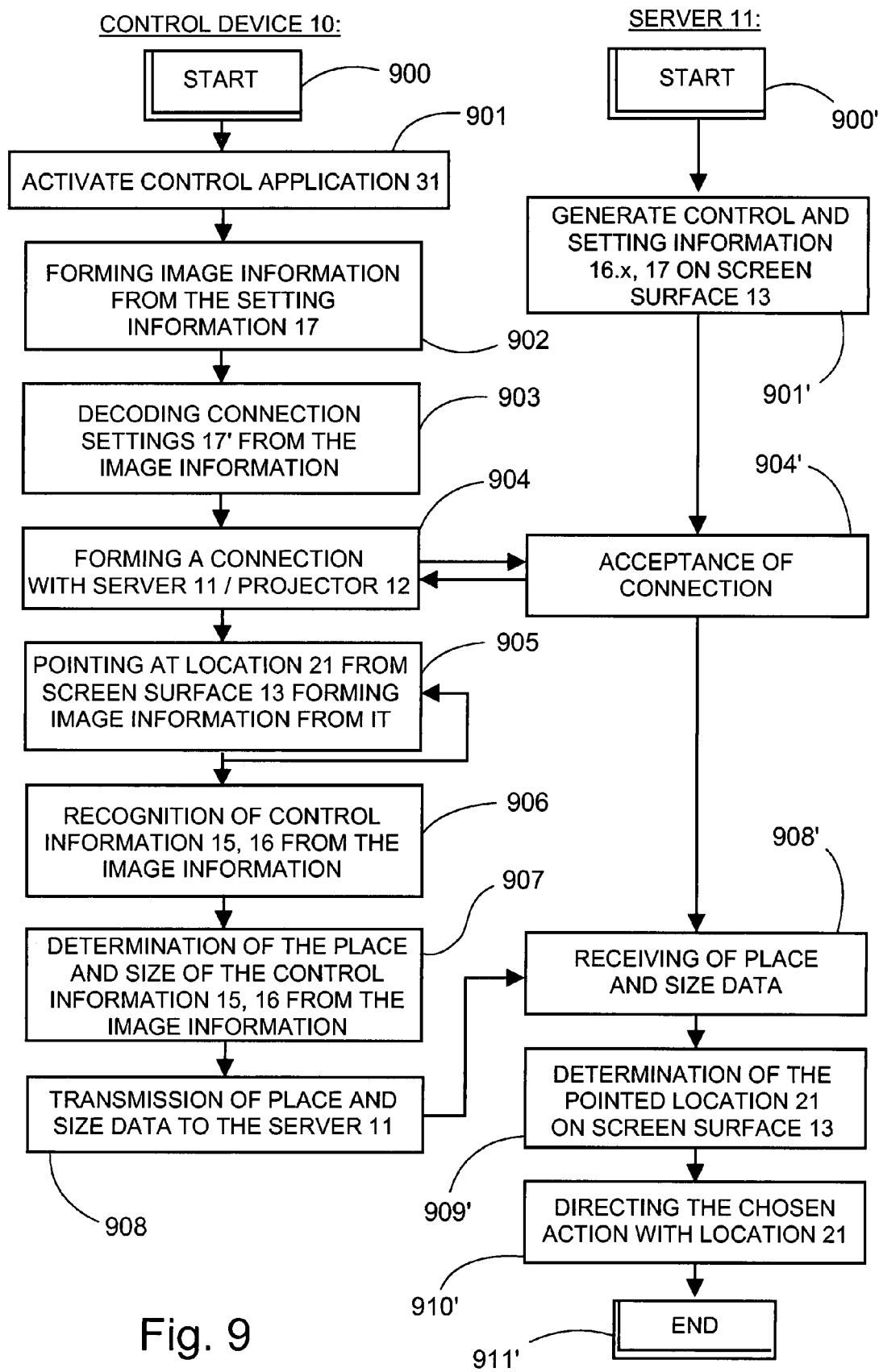

The invention, which is not limited to the embodiments to be presented in the following, will now be presented in greater detail by referring to the appended figures, wherein FIG. 1 is a rough schematic view of an example of a system according to the invention, FIG. 2 shows a block diagram of a basic application example of the control device according to the invention, FIG. 3 shows a block diagram of a basic application example of an information device arrangement according to the invention, FIG. 4 shows an application example of control information presented on an information surface, FIG. 5 shows an application example of a view in a control device's viewfinder, FIG. 6 shows examples of some embodiments made possible by the invention, FIG. 7 shows a first more advanced embodiment concerning control information, FIG. 8 shows another more advanced embodiment concerning control information, and FIG. 9 shows a flow chart of an example of the method according to the invention.

The invention relates to the use of one or more devices 10, 10.1, 10.2 equipped with a camera CAM and with the necessary functionalities for presenting and/or forming information INFO, more generally for its control. Intervals in the performance of the invention are presented in suitable places of the description referring to the flow chart shown in FIG. 9.

FIG. 1 is a rough schematic view of an example of the system according to the invention. As can be seen in FIG. 1, the basic idea of the invention provides applications for several actions and situations of different types. Thus, the actions and application situations to be presented as examples hereinafter are not to be understood as limiting the invention's possible areas of application in any way.

The system according to the invention comprises as its major parts at least one server 11, at least one presentation device 12 connected to the server 11 for data communication and at least one control device 10. Together, the server 11 and the presentation device 12 may also form an information device arrangement 11, 12 or they may also be separate from each other. The control device 10 and the server 11 may also be a complete solid device unit, such as, a "Smartphone" and in that embodiment there may be only an external display or projector unit 12 that is instructed by the "Smartphone".

Instead of cost-intensive systems of the SMART board type, the invention makes it possible to use, for example, standard office equipment. One application example is an information apparatus 11 in general use and known as such and equipped with a processor, which apparatus 11 can be connected to the presentation device 12.

The server may be, for example, a computer apparatus or equivalent, such as, for example, a PC device 11. The presentation device may be, for example, a data projector 12 (video projector). Besides the presentation device 12, the system may also include at least one projection screen 12', wherein there is at least one information surface 13. On the information surface 13 it is possible to present at least information INFO or a reference FILE to such, which is visualised on it from the data projector 12 controlled by the server 11. The whole wide area of the information surface 13 may be used in these purposes.

On the other hand, the server 11, the presentation device 12 and the information surface 13 may also form one compact entity. The server functionality may hereby be integrated even in the presentation device 12 itself, or vice versa. The presentation device 12 may also be, for example, a display of the LCD type. Hereby it already in itself has an information surface 13 for presenting at least information INFO. According to one more embodiment, the server may even simply be a piece of mobile equipment, which can be connected to an external display or data projector. There are numerous alternatives, and of course they are not in any way limited by the basic principle of the invention.

FIG. 2 shows a block chart example of a control device 10 according to the invention for controlling an information apparatus 11. As was mentioned earlier, the control device may be, for example, a mobile equipment (ME) 10 of a kind known as such, which is equipped with camera means CAM of a kind known as such with an image processing chains IC for operating an information surface 13. In addition, the device 10 also includes display means, such as, for example, the camera's CAM viewfinder VF. Instead of the mobile equipment, various portable devices equipped with a camera may be applied, such as, for example, PDA (Personal Digital Assistant) devices or even a digital camera.

Owing to the camera means CAM belonging to the device 10 it is possible surprisingly to carry out controlling of the information apparatus 11 by operating without contact the destined location 21 of information surface 13 by the control device 10. Hereby the device 10 or rather its camera CAM is aimed at the information surface 13 from a distance and at the desired location 21 therein. The place of the targeted location 21 in the image information IMAGE should be arranged in an established manner, such as, for example, in its centre.

In the context of the invention, operating of the information surface 13 can be understood as aiming at it or pointing it with the camera CAM of the control device 10. The aiming or pointing may be directed to a particular point that may be in any location on the information surface 13. Thus, the invention allows the pointing of the particular location that may be select freely from the information surface 13. From the image information IMAGE formed from the information surface 13 by the camera means CAM by using of which the information surface 13 is continuously and directly pointed, it is possible to determine a continuous stream of locations 21 on the information surface 13 pointed by the control device 10 in order to carry out control actions directed to the information apparatus 11. This makes control of the presentation effortless even from distances from the presentation surface 13.

Continuous pointing procedure of the information surface 13 helps tracking the movement of the location 21 of pointing in order to control the particular point of the whole wide information surface 13. This continuous pointing enables interactions such as "Drag" or "point and click" or "place". In this sense placing gets more accurate if user can move ("drag") the object (e.g. a photo) "live" on screen 13 instead of just "aim & shoot" (single opportunity). If the user misaims in "aim & shoot" case, this causes that the user needs to re-aim and re-shoot. This is not at all user-friendly.

In addition, the control device 10 includes processor means CPU1. These are used to control and attend to the functions of device 10 in a manner known as such. Besides the basic functions of device 10 (for example, mobile telecommunication), the processor means CPU1 may also be used for determining from the image information IMAGE formed by the camera CAM at least partly the location 21 on the information surface 13 pointed at each time by the control device 10 as well as an action to be directed at the location 21 (FIG. 5). On the other hand, it may also be sufficient just to form the image information IMAGE with the device 10. Hereby the server 11 can be used to carry out mainly the steps needed for determination of the pointed location 21.

FIG. 6 shows an example of an information surface 13 in an application situation. According to a first embodiment, in the freely selected pointed location of the information surface 13 there may be just a virtual desktop, to which information may be added by the control device 10. On the other hand, in the concerned particular location of the information surface 13 there may also be information INFO already presented by the apparatus 11, 12, whereby the action is directed to this. The position of the location of the information INFO or the operated location in general may be freely selected. This makes the invention especially suitable for the applications in which the information INFO is created or edited in connection with the meeting, for example. Thus, there are no requirements in the invention, that certain information should be in a predefined location in order to control that. Information INFO may be set on the surface 13 completely freely. If some information 18, 19, 20, has already been presented at the concerned location somewhere in the surface 13, then this can of course also be edited or other actions can be directed to the concerned particular location. Moreover, a reference may have been presented as information at the concerned location to some file FILE or equivalent electronic information entity. Its content may, for example, be downloaded in the control device 10 from the server 11 by pointing at the concerned file icon FILE and by choosing the downloading function or corresponding gesture. In the context of the invention, the "information" concept can be understood in numerous different ways.

Besides the processor CPU1 attending to the functions of the control device 10, the mobile equipment 10 or the control device 10 in general is also equipped with suitable communication protocol means 22. Corresponding data transmission means 24 also belong to the equipment of the server 11 shown in the block diagram of FIG. 3. The data transmission means 22, 24 may be used for carrying out data transmission between the control device 10 and the controlled information apparatus 11 using a chosen communication path. The data transmission contains data x1, y1, hei, wid, gx, gy concerning at least the image information IMAGE formed by the camera means CAM from the information surface 13. This will be considered in greater detail later on in the description.

According to one embodiment, the data transmission means 22, 24 may be based on wireless local area network means. One example of such is the Bluetooth communication protocol BT. Another could be WLAN (Wireless Local Area Network). Of course, also other protocols capable of local data transmission are possible.

FIG. 3 shows an example of a server 11 according to the invention. The server 11, too, has a communication module 24 or equivalent. Using this it can carry out data transmission at least with one or more control devices 10. In addition, the server 11 has a data transmission interface 33, through which it is possible to control the information presentation device, such as the data projector 12 already mentioned above as an example. It should also be noted that besides a wireless connection it is of course also possible to apply wireline communication between the server 11 and the pieces of mobile equipment 10 or corresponding. This is in no way prevented by the application of camera means CAM to the controlling of the server's 11 or presentation device's 12 functions. It is true though, that the system may hereby suffer from some clumsiness, so that wireless control may be a more suitable manner in terms of user friendliness.

According to one embodiment, the implementation according to the invention may be a program implementation or a suitable combination of program and hardware level functions. In the following program products 30.1, 30.2 are described by way of example, which are arranged for the mobile equipment 10 and for the server 11 to be run in these.

Firstly, the server 11 shown in FIG. 3 may have presentation software 34 of a kind known as such. Upon start-up of server 11 and activation of application 34 (step 900') it can be used for presenting digital information INFO known as such from presentation applications. Best-known examples of these are images, presentations, drawings and text. The presentation software 34 may be formed, for example, by a virtual desktop and by menus shown in connection with it and by virtual tools. The basic equipment belonging to it is not described in greater detail in this context, because it and its various functions are obvious to the professional in the art. In principle, at least all corresponding functions are possible for implementation in the invention as also in traditional mouse-operated user interfaces or in more sophisticated solutions of the SMART Board type. Even generally, it is possible in the case of server 11 to speak of white boarding software 34.

Besides presentation software of a known kind (which could be, for example, MS PowerPoint 34) or integrated together with it, the server 11, in general, a computer (or a piece of software) is here provided with one or more code means 32.3, 32.4, with which the data projector 12 can be commanded to generate and present encoded screen surface locations 15, 16.x on the information surface 13. By utilizing of these it is possible to determine the particular location 21 on the information surface 13 chosen by the control device 10 (step 901'). An example of such is shown in FIG. 1. The program code call 32.3 can generate and temporarily store an array of encoded data items, together with their pixel size and on-screen location. For example, the array can be in form:

```
array(GENERATED) = {
    {datamatrix_1, bounding_box_of_datamatrix_1},
    ...,
    {datamatrix_(N-1), bounding_box_of_datamatrix_(N-1)},
    {datamatrix_(N), bounding_box_of_datamatrix_(N) }
}
```

More generally, it is possible in the context of the invention to speak of control information 15, 16.x to be generated and presented on the information surface 13 that covers the information surface 13 mainly but, however, sparsely without causing considerably inconvenience when performing controlling measures and viewing of the information INFO on that. The control information 15, 16.x can be merged by the information apparatus 11 with the information INFO visualised on the information surface 13 (code means 32.8). Hereby the control information 15, 16.x and the information INFO visualised by the information apparatus 11 is visualised on a common and same information surface 13 (code means 32.9). In such arrangement the information INFO presented on surface 13 may be on top of the control information 16.1, 16.2 (FIG. 8).

On the other hand, the control information 15, 16 may be brought about on the information surface 13 also by some other device than the server 11 proper, with which a view of the presentation software 34 is brought about. The control information 15, 16.x may also be presented on some other information surface (not shown). This may be a different information surface than the one, on which the server's 11 information INFO is presented.

According to one embodiment, the screen surface locations 15, 16.x can be visually detectable control information 15, 16.x. According to another embodiment, they may also be of a type undetectable by the human eye or very weakly detectable (code means 32.11). The control information 15, 16.x may be formed by visually encoded control elements 15 (code means 32.4). They may form control element groups 16.1, 16.2 on the information surface 13. On the information surface 13 the control element groups 16.1, 16.2 may form a control pattern entity 14 arranged in an established manner. From this control information 15, 16.x arranged in the known locations of the information surface 13 it is possible to determine a continuous stream of locations 21 of the information surface 13 operated and pointed by the control device 10 when performing controlling of the information INFO and presentation software 34.

Next, reference is made to FIG. 4, which shows control information in a case according to one embodiment. In the case of the control information, it is possible in the presented embodiment to speak of glyphs 15 or, more specifically, of array or matrix-like glyph groups 16.1, 16.2 formed by individual glyphs 15. Glyphs 15 belonging to an individual group 16.1, 16.2 may by themselves form a mini-matrix containing four glyphs, a glyph group 16.1, 16.2. Glyph groups 16.1, 16.2 may on the information surface 13 form a control pattern entity 14 arranged in an established manner. In this case, the control pattern entity 14 forms an assembly arranged in a matrix-like manner. From this assembly 14 can be determined the precise location of the information surface 13 pointed at each time by the control device 10. Also, creating small amount of small glyph groups 16.1, 16.2 and also, by positioning them sparsely it is possible to cover a bigger area without appreciable disturbance.

The maximum distance between glyph groups and the size of glyph groups 16.1, 16.2 depend on 1) the area the camera CAM covers and 2) the resolution of the camera images IMAGE (camera properties). The area the camera CAM covers is related to the desired distance between the camera CAM and the information surface 13. The resolution of the camera images IMAGE and the size of glyph groups 16.1, 16.2 are related in a way that the glyph groups 16.1, 16.2 must be detectable and recognizable in the image IMAGE captured by the camera CAM. In the embodiment implementation with low resolution camera images (160 by 120 pixels), the glyph groups 16.1, 16.2 are spanned in a way that enables pointing in the full wide information surface area 13 but the glyph groups 16.1, 16.2 take only 3.5% of the visible area. The suitable distance between camera CAM and surface 13 may be in this case when applying stream of low resolution images of mobile phone camera CAM, for example, 0.5-5 m (even 10 m and even over). For example, by utilizing the digital zoom it is also possible to increase the distance. Also, the dimensions of the screen 13 affect to this distance feature. One example to estimate the distance (to be able to point location or target somewhat steady) would be around 0.3-2 times the width of the information surface 13, at least with described setup of glyphs 15, 16.1, 16.2.

In general, the covering portion which glyph groups 16.1, 16.2 take from the information surface 13 may be, for example, 1-30%. However, the bigger cover may be annoying at least if using red glyphs or other such color, for example. On the other hand, it is possible to use hiding techniques (described later in connection with FIG. 7) to enable functioning even if the detection error rate would be bigger. Also, 30%.coverage (or even bigger), e.g. together with hiding feature can be used for encoding the connectivity details 17 together with the location information 16.1, 16.2 spread all over the surface 13 in order to be able to implement the seamless control connection.

According to one experimental embodiment the glyph's 15 size may be 16×16 pixels and the gap between two glyphs 15 may be 8 pixels. If 75% of each glyph's 15 area is painted with a signal color, this version would paint half (coverage=0.75*(16/(16+8))=0.5) of the pixels of the screen 13 with signal color(s) (if the whole screen area 13 is covered with glyphs 15 by using this gap setup). This kind of arrangement may be applicable if the signal color is chosen dynamically by using a hiding technique, such as the one presented in FIG. 8.

In this embodiment presented more detailed refGrid of size 240×192 pixels contains one glyph group of 40×40 pixels, thus area cover is (40*40)/(240*192)=0.03472 (this contains only the 2×2 glyph matrixes, not the connection pattern 17).

The glyph group assembly 14 may cover the whole large information surface 13, for example, divided at regular intervals. Each code conglomeration 16.1, 16.2 can be set to correspond to a certain location on the information surface 13. From each code group 16.1, 16.2 assisting the recognition of pointing it is hereby possible to determine very accurately that location 21 exactly on the information surface 13, at which the control device 10 is especially pointing/aiming and which is intended as the target for the desired action. This makes possible the free selection of the pointing location on the surface 13 and the whole wide area of the surface 13 may be utilized. This is important, for example, in the meeting room embodiments in which the system according to the invention is used, for example, to create new information INFO to a precise freely selected location or to manipulate the existing information being already on the surface 13 in a sporadic location.

The server 11 may be used for setting as control elements on the information surface 13 also setting information 17 relating to connection settings 17' (code means 32.5, step 901'). In general, the system may be configured so, that each or some of the datamatrices 17 contain connectivity details 17' to the computing device 11 that is generating the display 12' related to the datamatrices 17. Owing to this the system can be used for direct connectivity and direct manipulation of data displayed on screens of multiple devices. These features are important when several participants equipped with devices 10, 10.1-10.2 according to the invention want take part of the brainstorm.

If there are arranged multiple display surfaces related to multiple servers the switching between servers is arranged to be seamless. In this kind of embodiment the phone 10 may be first connected to server S(A) generating display D(A). Then, the user may want to point to display D(B) that is connected to another server S(B). The system (on the user's device 10, for example) may automatically decode the connection information 17' from the data on display D(B) and connect automatically to this particular server S (B). Owing to this feature the pointing events are sent directly to server S(B) instead of server S(A). Thus, the connection details 17' may also be determined dynamically from the continuous stream of connection detail information 17. Only pointing of the new surface equipped with the connection details 17 and imaging that with camera CAM is enough to take that control of this particular surface and possible server connected to it. This is very user-friendly.

On the information surface 13 datamatrix 17 relating to the connection setting information may form an assembly 17 formed by glyphs of a corresponding type. Matters relating, for example, to the session protocol and settings between the server 11 and the control device 10 may be decoded from it. Some examples of these are the Bluetooth address and port 17' used in communication. Based on these it is possible in the mobile equipment 10, with which the information surface 13 is continuously pointed at and the camera means CAM of which is used to form image information IMAGE of it (step 902), to conclude these connection settings, according to which a data transmission session is then set up with the server 11 (code means 31.5, step 903).

If the glyphs 15 are formed on the information surface 13 within a wavelength range visible to the human eye, they may be faded, for example, by a user at least partly, if they are not needed and/or if they interfere in some way with the presentation of information 18-20 to be performed on the surface 13. A control element 15, 16.x fading function is hereby set on from a device providing the control elements 15, 16.x on the information surface 13, such as, for example, from server 11 (code means 32.10). In consequence of this, the elements 15, 16.x are no longer projected on the presentation surface 13 or at least not on a part of it, but only the information 18-20 to be presented by the server 11 is projected on it.

It should be noted that the control elements 15, 16.x may according to one embodiment also be of a non-visual type. The data matrixes 16.x, 17 may hereby be visualised on the information surface 13 by using, for example, such a suitable wavelength range, which is more or less or even entirely invisible to the human eye control elements (code means 32.11). However, from the image information IMAGE formed by the mobile equipment 10 it is possible for the equipment 10 still to recognise a whole glyph group 16.1 at each time in the camera CAM and from this to determine the location 21 or session protocol data 17' pointed by the device 10 on the screen surface 13. One example of such non-visual control elements 15, 16 are infrared tags invisible to the human eye, which can still however be detected by the camera CAM. The presentation apparatus 12 may hereby need additional equipment, with which the infrared tags are brought about on the presentation surface 13. In addition, such an embodiment may also require calibration actions in order to align the tags in position on the screen surface 13, if a device separate from the presentation apparatus 12 proper is used to bring about the tags on the presentation surface 13.

The server 11 may also have a programme module or an equivalent functionality (code means 32.1), with which the stream of locations 21 of information surface 13 pointed by mobile equipment 10 can be determined (step 909'). The location 21 or their stream can be determined with server 11 at least partly by utilising the data x1, y1, hei, wid, gx, gy concerning the control information 15, 16.x received from control device 10 in step 908' and determined by this from the image information IMAGE. Hereby at least a part of the functionality concerning determination actions can also be arranged in the mobile equipment 10 in a surprising manner (code means 31.1, 31.4, 31.7).

Several advantages are achieved by such a decentralised determination arranged between the server 11 and the control devices 10, 10.1, 10.2. Firstly, it allows a reduction of the processing to be performed by the server 11, whereby it can serve more control devices 10, 10.1, 10.2 efficiently. On the other hand, by a decentralised implementation of this kind an advantage is also achieved in the accuracy of determination of the targeted location 21 or the stream of locations that is achieved by moving the control device 10, 10.1, 10.2 during control operation. If the control device 10 sends only information of which glyph groups 16.1, 16.2 are visible (determined by using of glyph data 23 arranged in the device 10, 10.1, 10.2), but not the location and size of the glyph groups 16.1, 16.2 in the viewfinder VF, the server 11 wouldn't be able to accurately calculate the location 21 or the stream of that which the user is pointing to. Now, with the determination performed also by the control device 10, where it is based on the image information IMAGE formed by a camera CAM having known characteristics, advantage is obtained from this small-scale determination. The decoded glyph data gx, gy and/or the data x1, y1, hei, wid produced by this determination can then be transmitted to the server 11 for final calculation of the actual operation screen location 21 (code means 31.3, 31.7). Server 11 does lookup in its array (i.e. array_generated) and continues the processing to find out the actual screen location 21. One way of implementing the determination will be considered later in this description. By transmitting to the server 11 only the decoded glyph data gx, gy and the data x1, y1, hei, wid determined from the image IMAGE by the control device 10 is avoided the transmission of the huge amount of entire image data, which would slow the system operation considerably.

According to another embodiment the client device 10 may send the actual cropped bitmap image inside the box ((x1,y1) (wid,hei)) and the detection is performed on the server 11. However, this makes much more traffic and the client device 10 needs to "detect" the glyphs 16.1, 16.2 even if not going to the recognition process (i.e. find where the glyphs 16.1, 16.2 are in the image IMAGE).

Yet, according to one embodiment the client device 10 may have received the array mapping glyph data 23 to locations (array_generated) and performs calculation by itself (similar with the code means 32.1 and 32.7 of server) and sends the result on screen coordinates (x,y) and relative distance to the server 11. Thus, there may be even several alternatives to perform this procedure.

The camera phone 10 can also be used for running program 31 of the kind already described in part in the foregoing and which allows an implementation according to the invention. In this program 31 there may be a programme module or an equivalent functionality, which is used for decoding by processor unit CPU1 the visually encoded information 15, 16.*x*, 17 from the image information IMAGE formed by camera CAM from information surface 13 concerning, for example, session details 17' and location glyphs 15, 16.*x*, which are presented on the information surface 13. From the control information 15, 16.*x* it is possible to determine the precise location 21 of information surface 13 at each time operated by the control device 10. From the setting information 17 it is possible to form connection setting data 17' to carry out communication between the information apparatus 11 and the control device 10 (steps 902, 903). In addition, the camera phone 10 has programme modules for connecting the data transmission session, for carrying out data transmission towards the server 11 and back from the server 11, including besides the above-mentioned data x1, y1, hei, wid, gx, gy concerning image information IMAGE or determined from this, also for example uploading application data, such as, for example, files FILE to server 11 and downloading application data, such as, for example, files FILE from server 11 to the mobile equipment 10 (code means 31.6). In general, the application data may be transferred from the mobile phone 10 to that particular anchored location pointed by the phone 10 and to receive from a specific location of the information surface 13 that is pointed by the phone 10. This embodiment provides a visual representation of the application specific data by using wide information surface 13 instead of small displays VF of mobile devices 10. There may also, be an equivalent module in the information apparatus 11 (code means 32.6).

As was already mentioned above, it is possible in the invention to present small visually encoded elements, "glyphs" 15, on the information surface 13. With the glyphs 15 or from their location in the image information IMAGE formed by the camera CAM it is possible to determine that location or the stream of locations of the information surface 13, which is pointed at with the control device's 10 camera CAM. With the camera CAM in the control device 10 a constant image flow is formed in an established manner in order to calculate the current information surface location 21 continuously pointed by the camera CAM (step 905).

Successive image frames IMAGE can be formed, for example, with a Nokia 6600 phone using about ten image frames per a second as the imaging frequency. Even at a lower imaging frequency compared with a conventional imaging frequency used, for example, in video or viewfinder imaging (for example, 15-30 image frames/second) it is possible to cope owing to the invention. When using a lower imaging frequency, the control device's 10 power consumption is reduced.

When wishing to take part with the control device 10 in the information INFO presented on the information surface 13, a connection is set up between the mobile equipment 10 and the server 11. Hereby the control device 10 is used for imaging special element patterns (glyph patterns) presented at one location of the information surface 13 (step 902). These are used for coding the details of the connection, such as, for example, a Bluetooth address and a server port 17'. The occurrence of a glyph group 17 comprising connection settings 17' in the image information IMAGE is easily noted with the mobile equipment's 10 viewfinder VF. When the glyph group 17 is in the viewfinder VF in its entirety, this can be acknowledged in order to carry out the connection setting decoding. This control element group 17 is recognised from the formed image information IMAGE and the connection setting data 17' is decoded from it in order to form communication connection between the information apparatus 11 and the control device 10 (step 903). Surely, the device 10 can also spontaneously recognise the concerned glyph group 17 and carry out decoding even without any confirmation from the user concerning the occurrence of a glyph group 17 on the viewfinder VF. When the connection has been once established there is no more need to take care of it, and the communication can proceed normally.

Right after creating the connection between the control device 10 and the server 11 the control device 10 may announce its identity. Owing to this everybody knows all the time who is operating the information on the surface 13 in each particular location.

After the data transmission connection between the control device 10 and the server 11 has been done as step 904, 904', the device 10 equipped with a camera CAM may begin sampling the targeted information surface area IMAGE, at which the control device 10 is pointed at each moment (step 905). The sampling procedure can be controlled by the user, whereby the camera CAM will not be imaging constantly.

The arrangement according to the invention can be enlarged to support more control devices 10, 10.1, 10.2 provided with a camera CAM in such a way that several representatives at a meeting can work at the same time on the screen means 12', distribute data FILE, INFO to one another and draw concept maps, for example. Each participant may download a copy of his own of all the contents INFO, FILE presented on the screen means 12' or just individual parts of the contents. Owing to this aspect the visually connected display 12' also becomes part of the shared memory space, where the original device 11 hosting the display 12' can provide access to other users to either keep a copy of the data shared or only view it during the visual interaction and knowledge creation.

The arrangement according to the invention can also be enlarged to support the user's gestures as an interaction method in the user interface. Gestures are generally known specific kind of interaction mechanisms, e.g. strokes, or in general, specific movement of the device 10 pointed to the screen 13 that is performed in this case with the mobile phone 10, 10.1, 10.2 and that is used for performing a previously defined action(s). One example of this is a gesture of moving the phone 10 away or towards the screen 12' by using of which movement can be activate as a intention to copy from or paste to the visually interactive screen 12' at/from a particular location. According to second example the user could "pull" objects from the screen 13 to download them to his device 10. The interaction may be as follows: 1) point to an object FILE on the surface 13; 2) press button on the mobile device 10; 3) drag the mobile device 10 backwards from the surface 13; 4) release button. Other examples of the gestures may be drag & drop, doubleclick, drag to "rubberband" a set of objects, etc. Also, the other 2D- or 3D-gestures are possible. In addition the current velocity of the phone 10 may also be determined in connection with the controlling. This may be inferred from the rate of change of the tags' 16.1, 16.2 positions and their sizes.

A description now follows in somewhat greater detail and by way of example of the elements 15 presented on the screen 12', from which that information surface 13 location is calculated, at which the mobile equipment 10 is pointed at each time. In the concerned embodiment, encoding is formed by L-shaped objects 15, which may also be called glyphs. Now the glyphs 15 may have four different orientations. One L-shaped glyph 15 can encode two bits. For eight bits, four glyphs 15 are hereby required, which form a glyph group 16. In the group 16.1 there may be two glyphs 15 to express the X coordinate and two glyphs 15 to express the Y coordinate. The glyphs 15 may hereby be arranged, for example, as a square assembly 16, 16.1, 16.2 shown in FIGS. 1 and 4-8. Each assembly 16, 16.1, 16.2 defines a screen location in the established manner. With the glyph groups 16, 16.1, 16.2 the screen surface 13 can be covered altogether more or less. The glyph groups 16, 16.1, 16.2 can hereby be presented as a matrix grid at regular intervals on the screen surface 13, where their distance, for example, in the horizontal and vertical directions is constant.

```
        L           L
        L           L
```

Each glyph group 16 in itself means a certain coordinate in the glyph group grid 14, which is provided on the screen 12', for example, by projecting with a data projector 12. These glyph group coordinates can be named, for example, by variables gx, gy (FIG. 4). The coordinates may begin at the top left corner of the information surface 13, where the glyph group's coordinate (gx, gy) is set to be (0, 0). Thence the coordinates grow in a manner known as such from coordinates by line and column ending in the glyph group located in the bottom right corner of the screen 12'. The utilization of these kind of glyphs 15, 15', 15" provides a smart way to encode datamatrixes 16.1, 16.2 with small amount of data.

Referring to FIGS. 4 and 5, an example is shown in greater detail of how to calculate the location 21 pointed by the control device's 10 camera CAM on the screen surface 13. Surprisingly, in the invention determination of the pointed location 21 can be carried out by applying several coordinate systems. Two coordinate systems are used in this embodiment (or three depending on interpretation in which one system may be on-screen coordinates (x,y)). The coordinate systems can be imagined as contained in one another. By such an embodiment that advantage is achieved, among others, that a considerably higher accuracy of determination of the pointed stream of locations 21 is hereby achieved than if using only a simple coordinate system covering the entire information surface 13. Also, this makes possible to control the surface 13 throughout.

The party rendering glyph groups 16, 16.1, 16.2 on the information surface 13, being a server 11 controlling a video projector 12, now knows at least some variables, which are used for determination of the targeted location 21. These variables may be called, for example, encoded rough large-scale variables. They form a rough main coordinate system, which corresponds to the entire large information surface 13 and the glyph groups 16, 16.1, 16.2 presented on it. These variables are determined, for example, at the stage where the glyph groups 16, 16.1, 16.2 are rendered on the whole wide screen part 12' (step 901').

The variables refGridHei and refGridWid shown in FIG. 4 mean the mutual distance of the glyph groups 16 presented on the screen part 12' next to each other. More specifically, this distance can be determined, for example, in such a way that it is the distance between the glyphs 15', 15" in the top left corners of glyph groups 16. Variable refGridHei means the distance in the screen part's 12' Y direction, that is, the height direction. Variable refGridWid means the distance in the X direction, that is, the screen part's 12' width direction. In the example shown in FIG. 4, the values of these variables may be set to be, for example, refGridWid=240 and refGridHei=192. The values suitable for variables refGridWid and refGridHei may depend, for example, on from how far a distance the screen part 12' is to be pointed at or on the resolution of the camera means's 10 camera CAM.

Yet, a third variable also known by the server 11 is the height and width (sqsize) of each glyph group 16.1. In other words, sqsize means the length of the glyph group's 16.1 side, for example, between the top corner farthest to the left and the top corner farthest to the right and between the top corner farthest to the left and the bottom corner farthest to the left. In the application example shown in FIG. 4, as the value of variable sqsize, is set to be 40.

Referring to FIG. 5 a situation is now presented from the viewpoint of the control device 10, where the location 21 is determined, which is pointed by the camera CAM. Here the image information IMAGE is applied, which is formed by the camera CAM and presented on the display VF of the camera device 10. On the display VF, for example, at its centre, a small graphic aid can be presented, which is, for example, a point. The intended location 21 of the information surface 13 or the information INFO presented on the information surface 13 should be placed at the point at each time. With the graphic aid an exact determination of the intended location 21 is achieved. Hereby an embodiment to be presented later for calculation of the targeted location 21 results in exactly that location on the information surface 13, where this graphic aid is located in the image information IMAGE. From the image information IMAGE it is possible with the processor means CPU1 of the device 10 to determine data x1, y1, x2, y2, hei, wid concerning the fine-location 21 of the information surface 13 operated by the control device 10 at each time (code means 31.1). The programme code 31 may receive as input the image information IMAGE formed by the control device 10 from the information surface 13. The camera device 10 detects an array of datamatrixes 16.1, 16.2 that is "seen" (i.e. detected and recognized) through the camera 10/viewfinder VF). The code call may have a form of "array(VISIBLE): (datamatrixDataV1, locationV1, sizev1) . . . (dmDVm, locvm, szVm)". By comparing these two arrays (GENERATED and VISIBLE), and based on the comparison may be calculated 1) the accurate location of the camera/viewfinder 10 pointing at and 2) a relative distance from the canvas 13.

In addition, processor CPU1 can also recognise an action directed at the location 21 or a corresponding activation/acknowledgement command (code means 31.2), according to which the server 11 will then carry out the concerned action (code means 32.2). In its simplest form it is sufficient with a short or long push on a function keypad 35 of the device 10 in a manner known from mouse control devices. The action to be performed may depend, for example, on which tool is active at the time (is an object to be dragged or is an object to be drawn, for example).

The data x1, y1, hei, wid, gx, gy concerning the location 21 of information surface 13 operated by the control device 10 and the action protocol command directed at the concerned location 21 are then transferred to the information apparatus 11 by the control device's 10 data transmission means 22. One should understand that performing continuous controlling in which, for example, some target object FILE is moved on the surface 13 (the aimed location of the camera CAM changes all the time), this imaging and location determining procedure is continuous. In the case of control device 10, the viewfinder image IMAGE can be understood as a kind of small-scale coordinate system, which merges into the large-scale glyph group coordinate system 14 rendered by the server 11 on the presentation surface 13.

The control device 10 itself may also be used for choosing functions. Hereby available function alternatives can be presented, for example, on the phone's 10 display VF. The phone's 10 keypad 35 may also be used for choosing functions. In this way it is possible to avoid, for example, the going-through of difficult menus in the presentation software 34.

The resolution of the display/camera CAM functioning as viewfinder VF is known in the camera device 10. The variables vf_wid and vf_hei can be set to correspond to this resolution value in the corresponding width and height directions. According to one embodiment, the value of variable vf_wid may be fixed to be, for example, 160, and the value of variable vf_hei may be fixed to be, for example, 120. Such values may be used, for example, in many cameras CAM provided with the Symbian operating system for a quick input.

In the case of described embodiment, the data determined by the control device 10 from the image information IMAGE includes information on the location x1, y1, x2, y2 and size hei, wid of the control information, that is, the glyph groups 16.1, 16.2 in the image information IMAGE. In addition, the data also includes the decoded/recognized control information. That is the decoded byte value of the 2×2 glyph group (gx, gy), for example. This can be clarified with the code means 31.7, which can be a sub-module to code means 31.1. The determined information and the size vf_hei, vf_wid of the image information IMAGE can be sent to the information apparatus 11 in order to determine the location 21 of the information surface 13 operated by the control device 10 (code means 31.3). To get the size vf_hei, vf_wid of the image information IMAGE to server 11 one transmission from each device 10, 10.1, 10.2 is sufficient. From the viewfinder image IMAGE it is possible to determine the location and size of the glyph group 16.1 in the targeted image information IMAGE. This can be understood as an action taking place in a small-scale coordinate system, wherein the exact place and zooming of the pointed location 21 are determined from the place x1, y1, x2, y2 and size hei, wid of the glyphs 15.

The location in viewfinder image IMAGE of the glyph group 16.1 (i.e. the VISIBLE datamatrices) detected and recognised from the image information IMAGE by the camera CAM and the computing device CPU1 attached to it in step 906 can be expressed as coordinates (x1, y1), (x2, y2). Here the coordinates (x1, y1) mean the location of the glyph group's 16.1 top left corner in the viewfinder image IMAGE. Correspondingly, the coordinates (x2, y2) mean the location of the glyph group's 16.1 bottom right corner in the viewfinder image IMAGE. The glyph group's 16.1 size, that is, zooming, can be expressed as height (hei) and width (wid). In the embodiment shown in FIG. 5, the location and size of the glyph group 16.1 presented in viewfinder image IMAGE and entirely visible therein can be roughly estimated as being as follows: x1=40, y1=20, x2=54, y2=35. Of course, the glyph group's 16.1 height hei and width wid in the viewfinder image IMAGE are obtained from this in such a way that wid=x2−x1=54−40=14 and hei=y2−y1=35−20=15. All these matters can be clarified from the image information IMAGE by the code means 31.7 in step 907.

Besides the location and size of the glyph group 16.1 in the viewfinder image IMAGE, the camera device 10 can be used for determination of the concerned glyph group's 16.1 location (gx, gy) in the glyph grid 14, that is, in the large-scale coordinate system presented by the presentation device 12. This is found out by recognising the assembly located in the glyph group square 16.1 and by searching the lookup table 23 arranged in device 10 for the coordinate corresponding with the concerned recognised assembly. The device 10 may hereby be provided with a memory MEM containing the lookup table 23 in question. By using data 23 in the lookup table decoding of the glyph group 16.1, 16.2 into coordinates (gx, gy) of the information surface 13 can be performed. Instead of the lookup table 23 located fixedly in the control device 10 it is also possible to use a lookup table, which is downloaded into the device 10 each time. This may be performed, for example, in connection with step 904. This can be an option, for example, in such a case that the manner of presenting the glyph group 16 is different in each meeting or e.g. due to circumstances depending on program suppliers. In a case according to the embodiment, the grid coordinates of the glyph group 16.1 in the viewfinder image IMAGE as seen on the screen 13 are gx=1 and gy=1.

When considering generally the implementation of the described embodiment the data (x1, y1, x2, y2, hei, wid) determined from the image IMAGE only describe the location and size of the glyphs 16.1, 16.2 that are captured by the camera CAM. The described implementation decodes all the four glyphs 15 on the client device 10, 10.1, 10.2, and transmits a byte (integer 0 . . . 255) representing them to the server 11 together with (x1,y1, wid,hei) in order to determine the "coarse" part of the screen 13 that is operated. The server 11 happens to know that it uses an evenly laid out glyph grid 14. It splits the byte to two integers (gx and gy, in the range 0 . . . 15) and continues calculation with refGridWid & refGridHei. The grid coordinates (gx, gy) can be considered as a traditionally understood coordinate system if the glyph groups 16.1, 16.2 are distributed evenly. If the glyph groups 16.1, 16.2 are put on the screen 13 in an arbitrary manner, another mapping (GridNum->on screen coordinates) is used instead of mapping grid coordinates (gx, gy) to on-screen co-ordinates (x, y).

When considering more precisely this "coarse" part determination the encoding (from 1 byte=8 bits to 4 glyphs) may go according to one embodiment as follows: first the byte is splitted to 2-bit parts (A B C D)->here AB (concatenated) (4 bits) is gx and CD (4 bits) is gy, secondly for each part (with value 0 . . . 3) create a L-shaped glyph as follows: 0=L, 1=_|, 2=−| and 3=|−These parts are put on-screen as follows:

| A | C |
| B | D |

The control device 10 pretty much reverses the process
from a glyph image to 2-bit parts (a, b, c, d)
find a structure->if 2×2 glyphs, form a 8-bit byte abcd
split it to gx and gy.
The server 11 can now calculate: gx=1, gy=2 and the top-left coordinates of the glyph group are now: x=refgrid_wid*1; y=refgrid_hei*2.

As is said in above there is also a possibility to use array_generated in the server 11, which would contain mappings (glyphgroup ID->screen location or bounding box of glyph group). Here glyphgroup ID would be the full byte.

The array_generated could also be according to another embodiment transferred to the client device 10 so that the client device 10 would be able to perform the whole of the location calculation and output the screen coordinates of the pointed location.

For calculating the location 21 pointed by the camera CAM it is sufficient that in the image information IMAGE formed by the camera CAM there is at least one glyph element group 16 in its entirety at each time. In group 16, two glyphs 15 can express the glyph group's 16 X coordinate and two glyphs 15 can express the glyph group's 16 Y coordinate.

According to one embodiment, the camera device 10 can send to server 11, for example, the top left (x1, y1) and also possible the bottom right (x2, y2) coordinates of the glyph group 16.1 recognised from the viewfinder image IMAGE (step 908). When the width and height of the camera device's 10 viewfinder VF are known (vf_wid, vf_hei) and the data corresponding to them has also been received by server 11 as step 908', it is possible there to calculate the final aimed-at location 21 of the screen surface 13.

Programme code 32 executed by the processor CPU2 of the server 11 receives as input data x1, y1, wid, hei, gx, gy concerning the image information IMAGE formed from the information surface 13 by control device 10 (code means 32.7). The each control device 10, 10.1, 10.2 performing the controlling is recognized by the server 11 by using, for example, their BT address (port). This makes possible that server 11 serves multiple devices connected the same display 12' utilising the visually interactive screen to share and manipulate the data in a collaborative manner, for example, in a negotiation situations. The on-screen coordinates of the screen location 21 pointed by the camera means 10 can be calculated by using the variable values x1, y1, wid, hei, gx, gy presented above and received from the control device 10 in the following manner by the code means 32.1 (step 909'):

$x=gx*refGridWid+(sqsize*((vf\_wid/2)-x1)/wid);$
$(x==1*240+(40*((160/2)-40/15)==347)$ $y=gy*refGridHei+(sqsize*((vf\_hei/2)-y1)/hei);$
$(y==1*192+(40*((160/2)-20)/15)==299)$ Based on this, the central location 21 in the viewfinder image IMAGE is directed to aim at a location (347, 299) in the coordinate system determined by the screen domain 13. A mouse pointer, object or the control action active at each time can now be aimed at this screen location 21 (step 910'). The concerned series of actions ends in step 911' if the final acknowledgement is received or corresponding indication to terminate the concerned action. It must be understood that steps 905-910' form a continuous loop to perform controlling of the information apparatus 11. Thus, this means that the information surface 13 is continuously pointed by the mobile phone 10 with out aiming any other objects than the information surface 13 that is operated. For this has been referred above in the description in connection with the imaging frequency of the camera CAM.

The scale variable that is required for, for example, the 3D control of the information (described later) and in order to determine how far the device 10 is from the tags 16.1, 16.2 depends on the distance between camera device 10 and screen surface 13. The variable scale may control, for example, the presentation size of the information. It may be determined to be as follows in which it is inferred from the size of the tags 16.1, 16.2 on display VF and in surface 13:

scale=(wid+hei)/2,0/*sqsize*;

The manner presented above of determining the location 21 presented on screen surface 13 by using the camera device 10 is to be understood as one application example only. The basic embodiment presented herein does not take into account, for example, the camera device's 10 possible orientation angle in relation to the screen surface 13. In order to carry out the determination of the intended pointed location 21 in the desired manner, the control device's 10 alignment in relation to the screen surface 13 must be of the established kind in this case. In a set-up of this kind, the screen surface 13 presenting the information INFO must be located rather directly in front of the camera device 10 being mainly in the same plane. However, the device 10 may be allowed a deviation angle of, for example, some ten degrees in relation to the pointed screen surface 13, but even then it is still possible to determine the pointed location 21 (for example, 10-15 degrees is ok). With an additional code adapted to the calculation, the camera device's 10 turning and tilting can be taken into account. This may be inferred from the tags' 16.1, 16.2 orientation and, for example, the utilization of a specific kind of "encoding" for the tags. This implementation is described more precisely later in the description. Also, the devices' 10, 10.1-10.2 angular velocities may be determined. This may be inferred from the rate of change of the tags' 16.1, 16.2 orientation. It is also possible by encoding (for example, by check sums) to recover from and cope with possible recognition errors that may sometimes occur in an optical recognition of this kind. When using more advanced camera optics, resolution and zoom, it is possible to increase the control distance from the information surface 13.

The method presented above can be varied in several different ways. Instead of the generated datamatrices that spans over the canvas 13, for examples, in two dimensions, the glyphs 15 can also be located dynamically on the whole wide screen surface 13. Locating them randomly on the surface 13 is hereby possible. In this case, the glyph patterns could be encoded by one number (byte) and the lookup table 23 could be used for conversion between the glyph group's 16 number and the glyph group's 16 top-left coordinate.

It is possible in the embodiment presented above to manage even without the lookup table 23. The gx*refGridWid and gy*refGridHei formulas could hereby be used for converting the encoded glyph data into top-left screen coordinates x1, y1 of the concerned glyph group 16. The "glyph data" would hereby simply be gx*16+gy.

The colours of glyphs 15 or glyph groups 16 can also be varied. One example of this is presented in FIG. 8. According to one embodiment, it is possible to adapt the expression of the control information 15, 16, for example, to the detection characteristics of the camera means CAM (code means 32.12).

The ability to recognise glyph groups 16.x can be improved by using, for example, some basic signal colour of the camera sensor CAM as the colour of glyphs 15. With known RGB sensors (Bayer), the colour of glyphs 15 can be, for example, red, green or blue. By using a signal colour the glyph group 16.1, 16.2 can be recognised easily on the screen surface 13 and the desired location can be determined further. Red glyph groups 16 are an example and they are presented against the background of a white screen 13.

The invention provides a means to render the application specific data to be presented visually and layered on top of the data grid 16.1, 16.2 on the visually interactive display 12'. The ways of expression of control and/or setting information 15, 16, 17 and of the information INFO presented on the screen surface 13 and/or the background of the screen surface 13 can also be compared to each other (code means 32.13). In case their difference does not meet a criterion set, for example, in regard to their colour, the expression of control and/or setting information 15, 16, that is, their colour in this case, can be changed in order to get a difference. Of course, it is also possible to change the colour of the information INFO presented on surface 13 and/or the background colour of the desktop of presentation software 34.

Such a situation may occur, for example, when the glyphs 15, 17 have been presented with, for example, a red colour. If a negotiator makes notes on the presentation surface 13 with a red colour, then the red glyphs 15, 17 will not necessarily stand out from the actual presentation information INFO shown on the screen surface 13. The similarity of the colours of control and/or setting information 15, 16, 17 and of the information INFO to be presented is hereby noticed and the colour of the control and/or setting information 15, 16, 17 is adjusted to be such that they can be better distinguished from the presented information INFO. This adjusting process may be performed automatic by the server 11.

Referring to FIG. 7, it can also be possible to adapt several colours to the glyphs 15 at the same time. In this way the data density of glyphs 15 may be increased. The density can be increased, for example, to eight bits per glyph 15 instead of using the density of two bits per glyph 15 in which there are eight bits per glyph group 16.1, 16.2 presented above. Data density is also increased by using glyphs of different shapes, besides increasing colours. By using, for example, five colours together with four different shapes the number of alternatives is 20*4. A data density of six bits/glyph is hereby achieved. RGB values corresponding to each dashing are shown in the bottom part of FIG. 7.

FIG. 8 shows one more embodiment relating to the expression of glyphs 15. There on the left side is presented the information surface without glyphs and on the right side with glyphs relating to the connection setup glyphs 17. More colours may be used here also for the purpose of reducing interference, for example, in a steganographic manner. Certain colours may hereby be reserved for data encoding. The colours used for data encoding may hereby depend, for example, on the background colour of the screen part 12'. A red colour for glyphs 15 on magneta presentation background BG can be mentioned as an example of this. A colour combination of this kind can be read clearly by camera phone 10, although it is not possible to distinguish, for example, by the human eye. The glyphs 15.1 presented on the screen surface 13 do not hereby interfere much with the actual information INFO' to be presented on the surface 13. RGB values corresponding to each dashing are shown in the bottom part of FIG. 8.

More generally, if in the content INFO visible to the user on screen surface 13 there is one or more signal colours characteristics of the camera sensor CAM, some minor adjustment can hereby be made to the colour of the content INFO. Even a small change in the colour of content INFO is enough to bring about control information 15, which the human eye cannot distinguish or that is minimally visible to the human eyes from the content INFO/background, but which the camera sensor CAM can distinguish. The use of yellow glyph groups on a white screen background can be mentioned as another example (for example, in the case of an LCD display).

Besides presentation and editing of information INFO, the invention also makes possible a transfer of information INFO, FILE between the server 11 and the mobile equipment 10. Using control device 10 it is possible to transmit by data transmission module 22 to information apparatus 11 such information FILE, 18, which is intended for visualisation or distribution. On the other hand, the control device 10 can also be used for receiving from the information apparatus 11 such information FILE, 18, which is set for visualisation and/or distribution by this.

Like the control, creating and editing of information INFO visualised on screen surface 13, transmission and receiving actions are also made possible by such data transmission means 22, 24 and connection settings 17' in both devices 10, 11, which according to the invention can also be determined from the connection setting information 17 presented on the information surface 13. Owing to this, those taking part, for example, in a negotiation will immediately get in electronic form the information presented in the meeting or formed during the meeting. Owing to the invention there is no longer any need for post-deliveries of information, for example, by e-mail, which is easy to forget, as is known. Instead or besides of the application specific data received by the device 10, 10.1, 10.2 from the server 11 the information INFO presented on the visually interactive display 12' can also be made available to other mobile devices' displays VF. In this case the information may be stored as image information captured by the mobile phone. It is also possible to store information locally for the future reference.

FIGS. 2 and 3 show rough schematic views of some application examples of program products 30.1, 30.2 according to the invention. The program products 30.1, 30.2 according to the invention for controlling the information apparatus 11 may be formed by memory means MEM1, MEM2, which can be fitted in connection with the control device 10 and the server 11, and by programme codes 31, 32, which can be executed by their processor means CPU1, CPU2 and which are written in the memory means MEM1, MEM2. The memory devices MEM1, MEM2 for the programme codes 31, 32 may be, for example, memory cards, which can be fitted in connection with portable equipment, CD media, which can be fitted in a PC environment, or also a static or dynamic application memory of the devices 10, 11, where it can be integrated directly or installed. In the case of server 11, the program product may also be integrated in the presentation software 34.

The programme codes 31, 32, which can be arranged in the device 10 and the device 11 according to the invention, may contain several code means 31.1-31.7, 32.1-32.13, which can be executed by processor means CPU1, CPU2. Their function can be adapted to the application descriptions just presented above, in the connection of which reference is made to them. The code means 31.1-31.7, 32.1-32.13 may be formed by a set of processor commands, which can be executed one after the other and which are used to bring about the functionalities desired in the invention in the devices 10, 11 according to the invention.

The functions of the information apparatus complex or information device arrangement 11, 12, in general, can now be controlled not only by one user but also by several users. This allows a considerably efficient teamwork, since every participant can even from his own place take part in controlling the information device arrangement 11, 12 with his own mobile device 10, 10.1, 10.2. In addition, the presentation system 11, 12 is easily moved from the negotiation premises to other negotiation premises and it is also quickly erected. The system requires no special calibration actions, but it can be used immediately upon its start-up. The arrangement allows various interaction methods (point and click, etc.). Pointing is possible, even if the phone 10 has no separate pointing device, such as, for example, a stylus (pen) or a mouse. The phone's 10 user interface UI in itself can be used as an information input device.

Various kinds of pointing at the desktop are examples of actions allowed by the invention. A mouse pointer 21 or information INFO presented on the information surface 13 can be transferred or edited as desired. Surprisingly, the invention also allows three-dimensional information control. For example, the size of the information INFO can hereby be changed on the information surface 13. If it desired, for example, to change the size of an image 18 shown on the information surface 13, the control device 10 can hereby be moved closer to the information surface 13 (decreasing) or moved farther away from the information surface 13 (increasing). It is even possible to move information 18 and change its size at the same time. This is done by application of the variable scale as was described in the foregoing.

The invention also allows downloading and uploading of files FILE on a common screen 13, for example, over a Bluetooth connection BT. The mobile equipment's 10 user can hereby upload a file FILE (Concert_video.3gp) from the device's 10 memory MEM to server 11, which will in this case project a downloading icon of the file FILE on the screen surface 13. Users of other pieces of mobile equipment 10.1, 10.2 can for their own part download on their own devices 10.1, 10.2 the video file FILE stored in the concerned server's 11 data memory MEM'. A corresponding procedure can also be implemented for image 18 (Concert.jpg). Image 18 may be presented as such on surface 13 or also as a corresponding file reference.

The arrangement may also be used for sending text elements to the screen 13 and also generally for writing text 20. The user can also draw pre-determined shapes (for example, arrows between elements, rectangles, circles, etc.) or also with a free hand, bring about new information 19 more generally, besides editing existing information INFO. Generally speaking, at least corresponding actions are possible as in traditional virtual presentation environments. And what is there to pre-vent from applying the invention also in parallel with traditional white boards based on contact. This means that the concept "surface 13" is not to be understood only as two dimensional flat like surface on which the information is projected but also as a electronic structure on which the information is presented (a LCD-display, for example).

As already said before, the camera device's 10 turning and tilting can also be taken into account. This may be inferred from the tags' 16.1, 16.2 orientation and the utilization of a specific kind of "encoding" for the tags.

The basic group 16.1, 16.2 of four L-shaped glyphs in their basic orientation as already described prior would encode a grid ID (0). If the user rotates the camera CAM by 90, 180 and 270 degrees, he will get other ID's for the same glyph group (in decimals 85, 170 and 255 respectively). According to one embodiment it is possible to use an encoding by using of which it would be possible to determine the orientation of the camera device 10, 10.1-10.2.

One way to deal out this would be to encode only values 0-63 to group of four grids (in carefully chosen way so that none of the encodings is a rotation of another: e.g. from above, if it is used ID (0) it is not possible to use ID's 85, 170 and 255—limiting the use to using 0-63 as in the current encoding would do (but it would lead to one of the L's being in fixed position). Other way would be using the current group of four glyphs and put an external marker for being able to detect the rotation (e.g. a fifth glyph or a single square or something). One example of this may be a glyph group

|   | L | L | L |
|---|---|---|---|
|   | L | L |   | or another example

|   | O | L | L |
|---|---|---|---|
|   |   | L | L |

In this alternative O may be a red filled square of size of L or a square with width and height being ½ of the width of an L). The latter alternative of these would look something like below, of course, dot location could also be different

|   | L | L |
|---|---|---|
| . | L | L | or (for values 0-63)

|   | O | L |
|---|---|---|
|   | L | L | or (for values 0-63)

|   |   | L |
|---|---|---|
| . | L | L |

Both ways above would allow to detect the "basic" orientation of the camera phone device 10, 10.1-10.2 (rotated 0, 90, 180 or 270 degrees). In addition, there would be possible need to handle the "in between" orientations, e.g. so that would have a 110 deg. rotated image and be able to interpret it as an image rotated by 90+20 degrees and continue the calculation respectively.

Although the invention has been described to a far extent as an application, wherein data x1, y1 determined from image information IMAGE and concerning control information 15, 16 is sent to a server 11, it is possible also to send image data IMAGE in its entirety to the server 11. Hereby all the determinations concerning the targeted location 21 are carried out on the server 11, while the control device 10 is used just to perform capturing of the image information IMAGE.

It is also possible to perform all location determinations and calculations relating to them surprisingly in the control device 10. In such case the control device 10 may transmit to the server 11 or even directly to the data projector or display device 12 only the final on-screen coordinates y and x, the value of the variable scale and the code which indicates the action to be performed or only the control commands in order to control the data projector or display device 12 directly. In this case the server 11 may transmit the data required by the determination to the control devices 10. Thus, in general, the comparison/calculation of arrays (GENERATED/VISIBLE) can take place in different places: 1) the computing device 11 that has generated the array of generated datamatrices 2) the computing device CPU1 attached to the camera CAM 3) in some setups 1+2 may be surprisingly the same computing device that may be, for example, the mobile phone 10.1.

In first possible case the server 11 knows location of each piece of control information, client 10 calculates and sends low-bandwidth data to server 11 to perform the full calculation. In the second possible case the locations of control information are sent to the client 10 (database 23), so the client 10 can calculate the actual pointing location 21. In the third embodiment the client 10 and server 11 parts are in the same device 10. In that case he client 10 itself controls the pointing.

The method and device 10 according to the invention can be adapted for use, for example, at group events with at least two participants. Some examples of such are negotiation events, idea generating events and brainstorming events. The invention can also be used for distributing information efficiently at mass events, such as, for example, fairs.

Hereby, for example, in the entrance hall to the fair there could be a server 11, presentation device 12 and information surface 13 according to the invention. The information surface 13 can hereby be used for presenting, for example, control and setting information according to the invention and, for example, a file downloading icon (reference) concerning content having a format of a set form. The file, which can be downloaded in the device 10, may contain, for example, details relating to the fair (for example, information on timetables and exhibitors).

Fair visitors may when entering set up a session with server 11 in the manner according to the invention and choose for downloading the concerned file in their portable device 10, which is equipped with camera means CAM. In this way the invention also allows an efficient distribution of information to several parties without even involving any presentation or generation of information. The information is in an electronic form in the device 10 for easy watching by visitors to the fair.

According to one more embodiment the control device 10 and the information apparatus may be the same unified device and there would only be an external display. A realistic case that is feasible even with the existing hardware would be e.g. software that has both functionalities (the camera part and the glyph generation part) running on Nokia 9500 communicator or corresponding "SmartDevice". This device would be connected via Bluetooth or WLAN to (a module connected to) directly on the data projector 12.

In a "smart projector" embodiment to the one display device is embedded the generating functionality of the encoded location elements and also possibly the hiding functionality of the encoded location elements (possibly to previously-known locations).

The single control device 10 that functions as a server could also be connected to a smart projector as a mouse replacement without needing to have any software installed on the PC. The smart projector may be connected to a PC (without the "server" functionality). The same analogy may be applied in this connection with the "virtual" mice of some of present projector remote controls that connect as a mouse to the PC.

It should be understood that the foregoing description and the figures relating to it are only intended to illustrate the present invention. Thus, the invention is not limited only to the embodiments presented above or defined in the claims, but many such different variations and modifications of the invention are obvious to the professional in the art, which are possible within the scope of the inventive idea defined in the appended claims.

REFERENCES

[1] http://www.cl.cam.ac.uk/Research/SRG/netos/uid/spotcode.html (available at least 27.06.2005)

The invention claimed is:

1. Control device for controlling an information device arrangement, which control device includes camera means (CAM) and display means (VF) to allow operating of a destined location of the information surface, which destined location is adapted for determination from the control information being in the image information (IMAGE) formed by the camera means (CAM), characterized in that the control device is arranged at least to determine from the control information of the image information (IMAGE) data (xl, yl, hei, wid, gx, gy) in order to determine a continuous stream of locations pointed by the control device, wherein the control device is configured to operate at a distance from the information surface, and characterized in that the control information is formed by visually encoded L-shaped control elements adapted to form control element groups each of which control element group including four L-shaped control elements and which control element groups form on the information surface a control pattern entity arranged in a set manner and covering the information surface mainly throughout, from which the location of the information surface operated by the control device can be determined.

2. Control device according to claim 1, characterized in that the control device is also adapted to determine an action to be taken with the location and which determined data (xl, yl, wid, hei, gx, gy) and the determined action are at least partly adapted to be transferred to the information device arrangement by a data transmission means.

3. Control device according to claim 1, characterized in that the control device is a mobile equipment.

4. Control device according to claim 1, characterized in that the processor means (CPU1) are adapted to recognise from the image information (IMAGE) setting information from which connection setting data of the information device arrangement is adapted to be formed for the concerned control device in order to carry out communication between the information device arrangement and the concerned control device.

5. Control device according to claim 1, characterized in that the control device is adapted to transmit to the information device arrangement information (FILE) to a specific location of the information surface and/or to receive from the information device arrangement information (FILE) from a specific location of the information surface, which is set for visualisation and/or distribution by information device arrangement.

6. Control device according to claim 1, characterized in that the location of the information surface operated by pointing that by the control device is adapted for determination partly in the control device and partly in the information device arrangement.

7. Control device according to claim 1, characterized in that the control information and the information (INFO) visualised by the information device arrangement are adapted for recognition from a common information surface.

8. Control device according to claim 1, characterized in that in the control device a memory (MEM) is fitted, wherein data (gx, gy) is fitted for determination of the control information on the information surface and in which data (gx, gy) concerning the control information of the pointed location is adapted to be transferred to the information device arrangement by a data transmission means.

9. Control device according to claim 1, characterized in that the specific movements of the control device are arranged to be used as an interaction method in the user interface.

10. Information system including an information device arrangement, which includes at least one information surface to which control information can be arranged on and at least one control device including camera means (CAM) and display means (VF) to allow operating of the information surface by utilizing the said control information and wherein controlling of the information device arrangement is adapted to be carried out by operating a destined location of the information surface by the control device, which destined location is adapted for de-termination from the control information being in the image information (IMAGE) formed by the camera means (CAM), characterized in that the control information is arranged to cover the information surface in the manner that permits the controlling of the information surface area mainly throughout, wherein the control device is configured to operate at a distance from the information surface, and characterized in that the control information is formed by visually encoded L-shaped control elements adapted to form control element groups each of which control element group including four L-shaped control elements and which control element groups form on the information surface a control pattern entity arranged in a set manner and covering the information surface mainly throughout, from which the location of the information surface operated by the control device can be determined.

11. System according to claim 10, characterized in that the control device is adapted to determine from the control information of the image information (IMAGE) data (xl, yl, wid, hei, gx, gy) concerning the location of the information surface operated by the control device in order to determine a continuous stream of locations pointed by the control device.

12. System according to claim 10, characterized in that the control device is also adapted to determine an action to be taken with the location, which determined data (xl, yl, hei, wid, gx, gy) and the determined action are at least partly adapted to be transferred to the information device arrangement by a data transmission means.

13. System according to claim 10, characterized in that the control device is a mobile equipment.

14. System according to claim 10, characterized in that the processor means (CPU1) are adapted to recognise from the image information (IMAGE) setting information that is arranged to be presented on the information surface, from which connection setting data of the information device arrangement is adapted to be formed for the concerned control device in order to carry out communication between the information device arrangement and the concerned control device.

15. System according to claim 10, characterized in that the control device is adapted to transmit to the information device arrangement information (FILE) to a specific location of the information surface and/or to receive from the information device arrangement information (FILE) from a specific location of the information surface, which is set for visualisation and/or distribution by information device arrangement.

16. System according to claim 10, characterized in that the location of the information surface operated by pointing that by the control device is adapted for determination partly in the control device and partly in the information device arrangement.

17. System according to claim 10, characterized in that said data determined by the control device from the image information (IMAGE) includes information on the place (xl, yl) and size (hei, wid) of the control information in the image information (IMAGE), which said information and the size (vf hei, vf wid) of the image information (IMAGE) are adapted to be transmitted at least partly to the information device arrangement for determination of the location of the information surface operated by the control device.

18. System according to claim 10, characterized in that the control information and the information (INFO) visualised by the information device arrangement are adapted for visualisation on a common information surface.

19. System according to claim 10, characterized in that the control information is adapted to be merged by the information device arrangement into the information (INFO) adapted to be visualised on the information surface.

20. System according to claim 10, characterized that the control information can be faded from the information surface.

21. System according to claim 10, characterized in that the control information is adapted for visualisation on the information surface by using a wavelength range invisible to the human eye.

22. System according to claim 10, characterized in that the expression of the control information is adapted to the detection characteristics of the camera means (CAM).

23. System according to claim 10, characterized in that the expression of the control and/or setting information is adapted for comparison with the expression of the information (INFO) presented on the information surface and/or with the expression of the background of the information surface, and if their difference does not meet a criterion according to the setting, the destined expression is adapted for a change in order to bring about a difference.

24. System according to claim 10, characterized in that in the control device a memory (MEM) is fitted, wherein data (gx, gy) is fitted for determination of the control information on the information surface and in which data (gx, gy) concerning the control information of the pointed location is adapted to be transferred to the information device arrangement by a data transmission means.

25. System according to claim 10, characterized in that the specific movements of the control device are arranged to be used as an interaction method in the user interface.

26. Method for controlling an information device arrangement, wherein controlling of the information device arrangement is performed by operating a destined location of an information surface by at least one control device which is equipped with camera means (CAM) and in which method on the information surface is presented control information by utilizing of which the des-tined location is determined from a image information (IMAGE) formed by the camera means (CAM), characterized in that the information surface is covered by the control information in the manner that permits the controlling of the information surface area mainly throughout, wherein the control device is configured to operate at a distance from the information surface, and wherein characterized in that the control information is formed by visually encoded L-shaped control elements adapted to form control element groups each of which control element group including four L-shaped control elements and which control element groups form on the information surface a control pattern entity arranged in a set manner and covering the information surface mainly throughout, from which the location of the information surface operated by the control device can be determined.

27. Method according to claim 26, characterized in that from the information surface is determined a continuous stream of locations pointed by the control device.

28. Method according to claim 26, characterized in that the location of the information surface pointed by the control device is continuously determined partly in the control device and partly in the information device arrangement.

29. Method according to claim 26, characterized in that from the image information (IMAGE) setting information is arranged to be presented, from which connection setting data of the information device arrangement is formed for the concerned control device in order to carry out communication between the information device arrangement and the concerned control device.

30. Method according to claim 26, characterized in that the control device is used to transmit to the information device arrangement information (FILE) to a specific location of the information surface and/or to receive from the information device arrangement information (FILE) from a specific location of the information surface, set for presentation and/or distribution by information device arrangement.

31. Method according to claim 26, characterized in that said data determined from the image information (IMAGE) by the control device contains information on the place (xl, yl) and size (hei, wid) of the control information in the image information (IMAGE), which said information and the size (vf_hei, vf_wid) of the image information (IMAGE) are transmitted at least partly to the information device arrangement for determination of the location of the information surface operated by the control device.

32. Method according to claim 26, characterized in that the control information and the information (INFO) presented by the information device arrangement are visualised on a common information surface.

33. Method according to claim 26, characterized in that the control information is merged into the information (INFO) to be visualised by the information device arrangement.

34. Method according to claim 26, characterized in that the control information can be faded from the information surface.

35. Method according to claim 26, characterized in that the control information is visualised on the information surface by using a wavelength range invisible to the human eye.

36. Method according to claim 26, characterized in that the expression of the control information is adapted to the detection characteristics of the camera means (CAM).

37. Method according to claim 26, characterized in that the expression of the control and/or setting information is compared with the expression of the information (INFO) presented on the information surface and/or with the expression of the background of the information surface, and if the difference between them does not meet a criterion according to the setting, the chosen expression is changed in order to bring about a difference.

38. Use of a method according to claim 26 in a group meeting with at least two participants.

39. Program product for controlling an information device arrangement, where controlling of the information device arrangement is adapted to be carried out by operating a destined location of an information surface by a control device, wherein the control device is configured to operate at a distance from the information surface, whereby the program product includes a memory means (MEMI), which can be fitted in connection with the control device, and a programme code, which can be executed by the processor means (CPU1) of the control device and which is written in the memory means (MEM1), characterized in that the programme code is adapted as input to receive image information (IMAGE) including control information which image information (IMAGE) is formed by the camera means (CAM) of the control device on the information surface, and the programme code includes first code means configured to determine from the control information of the image information (IMAGE) data (xl, yl, hei, wid, gx, gy) in order to determine a continuous stream of locations pointed by the control device, second code means configured to recognise an action to be taken with the location, and third code means configured to transmit data (xl, yl, hei, wid) concerning the determined location of the information surface and data concerning the action taken with it to the information device arrangement, wherein characterized in that the control information is formed by visually encoded L-shaped control elements adapted to form control element groups each of which control element group including four L-shaped control elements and which control element groups form on the information surface a control pattern entity arranged in a set manner and covering the information surface mainly throughout, from which the location of the information surface operated by the control device can be determined.

40. Program product according to claim 39, characterized in that the programme code includes fourth code means configured to recognise from the image information (IMAGE) control information and to decode data (gx, gy) from it, from whose place (xl, yl, gx, gy) and size (hei, wid) in the image information (IMAGE) is adapted to determinate the said location of the information surface operated by the control device.

41. Program product according to claim 39, characterized in that the programme code also includes fifth code means configured to recognise from the image information (IMAGE) setting information, from which connection setting data of the information device arrangement is adapted to be formed for the concerned control device in order to carry out communication between the information device arrangement and the concerned control device.

42. Program product according to claim 39, characterized in that the programme code also includes sixth code means configured to transmit to the information device arrangement information (FILE) to a specific location of the information surface and/or to receive from the information device arrangement information (FILE) from a specific location of the information surface that is visualised by it and/or set for distribution by it.

43. Program product for controlling an information device arrangement, where controlling of the information device arrangement is adapted to be carried out by operating a destined location of an information surface by a control device, wherein the control device is configured to operate at a distance from the information surface, whereby the program product can be arranged in connection with the information device arrangement and it includes a memory means (MEM2) and a programme code, which can be executed by the processor means (CPU2) of the information device arrangement and which is written in the memory means (MEM2), characterized in that the programme code is adapted as input to receive from the control device data (xl, yl, hei, wid) concerning image information (IMAGE) formed from the information surface, and the programme code includes—first code means configured to determine the location of the information surface operated by the control device by using data (xl, yl, hei, wid, gx, gy),—second code means configured to recognise an action to be taken with the location,—third code means configured to arrange control information on the information surface that control information is arranged to cover the information surface in the manner that permits the controlling of the information surface area mainly throughout, and—fourth code means configured to form control information of visually encoded L-shaped control elements adapted to form control element groups each of which control element group including four L-shaped control elements and which control element groups form on the information surface a control pattern entity arranged in a set manner and covering the information surface mainly throughout, from which the location of the information surface operated by the control device can be determined.

44. Program product according to claim 43, characterized in that the programme code also includes fifth code means configured to visualise setting information on the information surface for at least control device to carry out communication between at least one control device and the information device arrangement.

45. Program product according to claim 43, characterized in that the programme code also includes sixth code means configured to receive from the control device information (FILE) to a specific location of the information surface and/or to transmit to the control device information (FILE) from a specific location of the information surface that is visualised by it and/or set for distribution by it.

46. Program product according to claim 43, characterized in that the programme code also includes seventh code means configured to receive from the control device data containing information on the place (xl, yl) and size (hei, wid) of the control information in the image information (IMAGE) and also on the size (vf_hei, vf_wid) of the image information (IMAGE), and by using this information the code means is configured to determine the location of the information surface operated by the control device.

47. Program product according to claim 45, characterized in that the programme code also includes eighth code means configured to visualise the control information and the information (INFO) to be visualised (INFO) on a common information surface.

48. Program product according to claim 43, characterized in that the programme code also includes ninth code means configured to merge the control information into the information (INFO) to be visualised on the information surface.

49. Program product according to claim 43, characterized in that the programme code also includes tenth code means configured to fade control information from the information surface.

50. Program product according to claim 43, characterized in that the programme code also includes eleventh code means configured to visualise the control information on the information surface by using a wavelength range invisible to the human eye.

51. Program product according to claim 43, characterized in that the programme code also includes twelfth code means configured to adapt the expression of the control information to the detection characteristics of the camera means (CAM).

52. Program product according to claim 43, characterized in that the programme code also includes thirteenth code means configured to compare the expression of the control and/or setting information with the expression of the information (INFO) presented on the information surface and/or with the expression of the background of the information surface, and if their difference does not meet a criterion according to the setting, the code means is adapted to change the chosen expression in order to bring about a difference.

53. Program product according to claim 43, characterized in that the program code is configured to determine from the information surface a continuous stream of locations pointed by the control device.

* * * * *